United States Patent
Yu et al.

[11] Patent Number: 6,096,088
[45] Date of Patent: Aug. 1, 2000

[54] METHOD FOR MODELLING THREE DIMENSION OBJECTS AND SIMULATION OF FLUID FLOW

[75] Inventors: Hua Gang Yu, Ringwood North, Australia; Roland Thomas, Wayland, Mass.

[73] Assignee: Moldflow Pty Ltd, Kilsyth Victoria, Australia

[21] Appl. No.: 08/932,125

[22] Filed: Sep. 17, 1997

[30] Foreign Application Priority Data

Mar. 20, 1997 [AU] Australia ................................. PO5746

[51] Int. Cl.[7] ............................... G06G 7/48; G06G 7/50
[52] U.S. Cl. ...................... 703/9; 703/1; 703/2; 703/5; 700/98; 700/197; 264/328.1; 264/645; 425/542
[58] Field of Search ............................... 364/578, 475.02, 364/468.04; 425/542; 264/645, 328.1; 700/98, 197; 703/1, 2, 5, 6

[56] References Cited

U.S. PATENT DOCUMENTS

| | | | |
|---|---|---|---|
| 4,989,166 | 1/1991 | Akasaka et al. | 364/578 |
| 5,189,626 | 2/1993 | Colburn | 364/474.24 |
| 5,543,093 | 8/1996 | Nakamura et al. | 264/40.5 |
| 5,700,406 | 12/1997 | Menhennett et al. | 264/40.4 |
| 5,760,779 | 6/1998 | Yamashita et al. | 345/421 |
| 5,835,379 | 10/1998 | Nakano | 364/475.02 |

OTHER PUBLICATIONS

Kennedy; "Governing Equations for the Filling Phase"; Flow Analysis of Injection Molds, Hanser Publishers, Munich Vienna New York, 1995; pp. 59–90.

"A Better Approach to Midplane Generation Will Keep C–MOLD Users A Step Ahead," C–MOLD News, vol. 8 No. 4, Jan. 1996.

"Optimizing injection–molded parts," Mechanical Engineering, pp. 89–90, Oct. 1996.

CUBIT User Manual, http://sass2537.sandia.gov/SEACAS/CUBIT/Users/Cubitchapter1.html, Chapters 1–2, 4–5, Appendix B, May 1994.

*Primary Examiner*—Kevin J. Teska
*Assistant Examiner*—Samuel Broda
*Attorney, Agent, or Firm*—Larson & Taylor

[57] ABSTRACT

A method is provided for simulating fluid flow within a three dimensional object having first and second generally opposed surfaces. The method includes: matching each element of the first surface with an element of the second surface between which a reasonable thickness may be defined, wherein matched elements of the first surface constitute a first set of matched elements and matched elements of the second surface constitute a second set of matched elements, specifying a fluid injection point, and performing a flow analysis using each set of the matched elements. In this way, the injection point is linked to all locations on the first and second surfaces from which flow may emanate such that resulting flow fronts along the first and second surfaces are synchronized.

100 Claims, 18 Drawing Sheets

METHOD FOR MODELLING THREE DIMENSION OBJECTS AND SIMULATION OF FLUID FLOW

This invention relates to a method for modelling solid objects, particularly for use in the simulation of fluid flow, to be used for example to simulate prototypes before production. In a preferred embodiment the method is used in the design of articles to be manufactured by injection molding, preferably from molten plastic materials.

The modelling of solid objects is employed in various fields. Such modelling is used, for example, in the simulation of injection molding. In that field, it is widely recognized that the filling and packing phases of injection molding have a significant effect on the visual and mechanical properties of a molded object. Simulation is employed to analyse proposed shapes and injection points, and thus the final quality of the ultimate article. A requirement of any injection mold is that it can be filled with molten polymer given the pressure limits of a real injection molding machine. Simulation can provide information as to whether the mold can be filled and the fill pattern that will be achieved. By using simulation, it is possible to determine optimum gate locations and processing conditions. It is possible to predict the location of weld lines and air traps. Economic benefit is derived from simulation because problems can be predicted and solutions tested prior to the actual creation of the mold. This eliminates costly re-working and decreases the time required to get an object into production.

Simulation technology has been developed and generally uses finite element/finite difference techniques to solve the governing equations of fluid flow and heat transfer. In order to minimize the time required for analysis and hence the required computer resources, the Hele-Shaw approximation is invoked to simplify the governing equations. It has been found that this simplification provides sufficient accuracy for injection molding but does create the need for specific modelling of the computational domain.

Injection molding is an excellent process for repetitively manufacturing large numbers of objects or parts having complicated geometries. A characteristic of injection molded components is that the thickness of the wall is generally a small fraction of the overall length of the component. In view of the low thermal conductivity of plastics, this physical characteristic is essential to achieve the rapid cycle times that make the process so attractive.

The flow of melt in an injection mold is determined by the familiar conservation laws of fluid mechanics. Solution of the equations in their full generality presents several practical problems. Owing to the characteristically thin walls of molded components, however, it is possible to make some reasonable assumptions that lead to a simplification of the governing equations. These simplified equations describe what is called Hele-Shaw flow and may be readily solved in complex geometries using an appropriate numerical technique such as the finite element and/or finite difference method.

Injection molding simulation is now routinely regarded as a desirable aspect of plastic part design. Similarly, improved computer aided drafting (CAD) technology has led to the widespread use of surface and solid modelling. Associated advantages of this are the ability to better visualize an object, to use numerical cutting, and the possibility of achieving more concurrency in engineering design and manufacture. When using the Hele-Shaw approximation, plastic CAE analysis still requires the use of a surface model, representing the midplane of the real component, which is then meshed with triangular or quadrilateral elements to which suitable thicknesses are ascribed. The preparation of such a mesh can take a considerable amount of time, and requires substantial user input; owing to the labour intensive nature of this step, model preparation requires the greatest share of time when performing a molding simulation and makes this technique time consuming. In addition, as model preparation is an interactive task, it has a higher cost associated with it than simply running a computer program.

One solution to the above shortcomings is to avoid the use of the Hele-Shaw equations and solve the governing equations in their full generality. This has inherent problems owing to the thin walled nature of injection molded objects and parts. To perform such an analysis, the region representing the mold cavity into which molten polymer will be injected must be divided into small sub-domains called elements. Usually these elements are of tetrahedral or hexahedral shape. This process of subdivision is called meshing and the resultant network of tetrahedra or hexahedra the mesh. Owing to the complicated shape of many injection molded objects and parts it is generally not possible to automatically mesh the cavity with hexahedral elements. It is possible, however, to mesh the domain automatically with tetrahedral elements. The thin walled nature of injection molded objects and parts means that the plastic is subject to a huge thermal gradient in the thickness direction of the component. This requires that there be a reasonable number of elements through the thickness. Using existing meshing technology, the result is a mesh consisting of hundreds of thousands or even millions of elements. The high number of elements makes the problem intractable for any but the fastest super computers. These are rarely found in industry, being extremely costly to purchase and maintain. Thus, although three dimensional simulation provides a solution that avoids the requirement of a midplane model, it is not as yet a practical solution.

It is an object of the present invention, therefore, to provide a method for the simulation of flow in a three dimensional object that can produce simulations substantially automatically, without requiring the solution of the governing equations in their full generality.

According to a first broad aspect of the present invention, therefore, there is provided a method for simulating fluid flow within a three dimensional object having first and second generally opposed surfaces including:

matching each element of said first surface with an element of said second surface between which a reasonable thickness may be defined, wherein matched elements of said first surface constitute a first set of matched elements and matched elements of said second surface constitute a second set of matched elements, specifying a fluid injection point, performing a flow analysis using each set of said matched elements, whereby said injection point is linked to all locations on said first and second surfaces from which flow may emanate such that resulting flow fronts along said first and second surfaces are synchronized.

It should be noted that, in this context, generally opposed surfaces may be parallel, inclined to each other, meet at an acute angle or otherwise, and need not be planar, provided that a thickness or thicknesses may be assigned to the space between the surfaces.

Preferably said injection point is first linked to all said locations from the commencement of said flow analysis.

Preferably said injection point remains so linked at all times in said flow analysis subsequent to said first linking.

Thus, although the injection point must be linked to all these locations at some point in the flow analysis, and essentially continuously thereafter, the injection point may remain unlinked initially. Although this may decrease the accuracy of the final analysis adversely, it may nevertheless allow the analysis to yield useful results.

Preferably said injection is one of a plurality of injection points.

Preferably said synchronization of said flow fronts is checked periodically.

Preferably said flow fronts are synchronized if found not to be or no longer synchronized.

Preferably said checking is performed at each time step.

Thus, although for simple objects it is sufficient to synchronize flow fronts by linking the injection point or points to all locations, more complex parts require this synchronization at each calculational time step.

Preferably said first and second generally opposed surfaces are one of a plurality of pairs of generally opposed surfaces.

Thus, where the existing techniques utilize a single, midplane representation of the object in which flow is to be modelled, and perform a simulation with this representation, the method according to the present invention utilizes only the outer surfaces defining the three dimensional object to create a computational domain. These correspond to representations (in a preferred embodiment, meshed representations) of the domain in which flow is to be simulated, and would comprise, for example, meshed representations of the top and bottom surfaces of a part. Thus, in such an example the invention could be said to utilize an outer skin mesh rather than a midplane mesh. Elements of the two surfaces are matched, based on the ability to identify a thickness between such elements. An analysis, substantially along conventional lines (by means, for example, of the Hele-Shaw equations), is then performed of the flow in each of these domains in which flow is to be simulated, but linked to ensure fidelity with the physical reality being modelled.

Preferably any unmatched elements of said first and second surfaces, being elements that could not be matched, are assigned thicknesses being the average of the thicknesses of adjacent matched elements where such adjacent matched elements exist, or of adjacent unmatched elements where such adjacent matched elements do not exist and said adjacent unmatched elements have been assigned thicknesses.

Thus, eventually all matched and unmatched elements of the first and second surfaces may be assigned thicknesses.

Preferably each element of an edge surface, being a surface between said first and second surfaces, and adjacent to either of said first or second surface is assigned a thickness proportional to the thickness of the element of said first or second surface to which said element of said edge surface is adjacent.

Preferably each said element of an edge surface is assigned a thickness between 0.5 and 1.5 times said thickness of the element of said first or second surface to which said element of said edge surface is adjacent.

Preferably each said element of an edge surface is assigned a thickness between 0.7 and 0.9 times said thickness of the element of said first or second surface to which said element of said edge surface is adjacent.

Still more preferably each said element of an edge surface is assigned a thickness 0.75 times said thickness of the element of said first or second surface to which said element of said edge surface is adjacent.

Preferably each element of an edge surface not adjacent to said first or second surface is assigned a thickness being the average of the thicknesses of adjacent elements of said edge surface that have been assigned thicknesses.

Assigning a thickness, therefore, to every element of both surfaces and of edge surfaces ensures that the greatest accuracy will be achieved in the simulation.

Preferably flow is simulated at a rate directly proportional to a desired flow rate for the object.

The desired flow rate will usually be a flow rate selected by a user based simply on the volume of the object to be filled and the desired fill-time.

Preferably said rate is proportional to the ratio of computational domain volume of said object to real volume of said object.

More preferably said rate is equal to the ratio of said computational domain volume to said real volume.

This approach may be used to compensate for the modification of the effective volume of the object being modelled, owing to the use of two domains (for example, associated with the top and bottom surfaces), rather than one meshed domain as in the midplane approach. The computational domain volume is thus this effective volume used for the purposes of modelling the object, which most preferably will be approximately double the real volume.

Preferably the method is performed with first and second representations of said first and second surfaces respectively comprising first and second meshes or lattices respectively, wherein said elements are interstices of said first and second meshes or lattices.

Preferably said elements are triangular or quadrilateral.

Preferably, when said elements are triangular, said elements are equilateral.

Preferably said method includes creating said first and second representations.

In one embodiment the method includes creating improved representations of said first and second surfaces, whereby said elements are elements of said improved representations and said method is performed with said improved representations.

Preferably said first and second representations are, or are a part of, a representation or representations for stereolithography of said object.

Thus, computer representations of the two surfaces may be provided as input to the method, may be created by the method, or—if provided with representations of the surfaces—the method may create improved representations. As described above, particularly preferred representations include those with elements comprising equilateral triangles.

In one embodiment of the invention the method described above is performed by a computer running a computer program encoding said method for simulating fluid flow.

Preferably said method optionally includes corrections for non-isothermal temperature fields and/or non-Newtonian fluids.

Thus, known techniques for including the effects of non-isothermal temperature fields and non-Newtonian fluids may be included so that more physically faithful simulations may be performed, as well as faster simulations without these corrections when speed is desirable, even at the expense of precision.

According to a second broad aspect of the present invention there is provided a method for simulating fluid flow within a three dimensional object having first and second generally opposed surfaces including:

providing or creating first and second representations of said first and second surfaces respectively, creating first and second improved representations from said first and second representations respectively, matching each element of said first improved representation of said first surface with an element of said second improved representation of said second surface between which a thickness may be defined, wherein matched elements of said first improved representation constitute a first set of matched elements and matched elements of said second improved representation constitute a second set of matched elements, specifying a fluid injection point, performing a flow analysis using each set of said matched elements, whereby said injection point is linked to all locations on said first and second improved representations from which flow may emanate such that resulting flow fronts along said first and second improved representations are synchronized.

Preferably the first and second representations are, or are a part of, a representation or representations for stereolithography of said object.

Preferably the first and second improved representations comprise small equilateral triangular elements.

According to a third broad aspect of the invention there is provided a computer provided with or running a computer program encoding the method for simulating fluid flow described above.

In a fourth broad aspect of the invention there is provided a computer storage medium provided with a computer program embodying the method for simulating fluid flow described above.

According to a fifth broad aspect of the present invention there is provided a method for modelling a three dimensional object including:

specifying first and second generally opposed surfaces of said object, forming first and second representations of said first and second surfaces respectively, wherein said first and second representations each comprise a plurality of elements, and matching pairs of elements of said first and second surfaces between which a thickness may be defined.

Preferably the first and second representations comprise first and second meshes or lattices respectively, wherein said elements are interstices of said first and second meshes or lattices.

Thus, the elements of the first representation are interstices of the first mesh, and the elements of the second representation are interstices of the second mesh.

Preferably said elements are triangular or quadrilateral.

Preferably, when said elements are triangular, said elements are equilateral.

Preferably each element of each of said matched pairs of elements is assigned respectively said thickness.

Preferably any unmatched elements of said first and second surfaces, being elements that could not be matched, are assigned thicknesses being the average of the thicknesses of adjacent matched elements where such adjacent matched elements exist, or of adjacent unmatched elements where such adjacent matched elements do not exist and said adjacent unmatched elements have been assigned thicknesses.

Preferably each element of an edge surface, being a surface between said first and second surfaces, and adjacent to either of said first or second surface is assigned a thickness proportional to the thickness of the element of said first or second surface to which said element of said edge surface is adjacent.

Preferably each said element of an edge surface is assigned a thickness between 0.5 and 1.5 times said thickness of the element of said first or second surface to which said element of said edge surface is adjacent.

Preferably each said element of an edge surface is assigned a thickness between 0.7 and 0.9 times said thickness of the element of said first or second surface to which said element of said edge surface is adjacent.

Still more preferably each said element of an edge surface is assigned a thickness 0.75 times said thickness of the element of said first or second surface to which said element of said edge surface is adjacent.

Preferably each element of an edge surface not adjacent to said first or second surface is assigned a thickness being the average of the thicknesses of adjacent elements of said edge surface that have been assigned thicknesses.

According to a sixth broad aspect of the present invention there is provided a method for simulating fluid flow within a three dimensional object having first and second generally opposed surfaces including:

matching each element of said first surface with an element of said second surface between which a thickness may be defined, wherein matched elements of said first surface constitute a first set of matched elements and matched elements of said second surface constitute a second set of matched elements, specifying a fluid injection point, performing a flow analysis using each set of said matched elements, and synchronizing flow fronts resulting from said flow analysis along said first and second surfaces.

Preferably said flow fronts are synchronized from the commencement of said flow analysis.

Alternatively said flow fronts are first synchronized after the commencement of said flow analysis.

According to a further broad aspect of the present invention there is provided a method for simulating fluid flow within a three dimensional object having first and second generally opposed surfaces including:

matching each element of said first surface with an element of said second surface between which a thickness may be defined, wherein matched elements of said first surface constitute a first set of matched elements and matched elements of said second surface constitute a second set of matched elements, specifying a fluid injection point, performing a flow analysis using said first set of matched elements, adapting said flow analysis to said second set of matched elements, and synchronizing flow fronts resulting from said flow analysis and said adaptation of said flow analysis along said first and second surfaces.

Thus, it is possible in some cases to perform the method using only one of the sets of elements, and mapping the result onto the other set, and performing minor adaptation of the analysis to allow for any differences between the two surfaces.

Preferably the method is performed with first and second representations of said first and second surfaces respectively comprising first and second meshes or lattices respectively, wherein said elements are interstices of said first and second meshes or lattices.

Preferably the elements are triangular, and most preferably equilateral triangles.

Preferably the elements are quadrilateral.

Preferably the method includes creating said first and second representations, and more preferably creating improved representations, either from the original surfaces or from the first and second representations, and performing the method with elements of the representations or improved representations.

In all the above methods according to the present invention aspects it is preferred that the synchronization comprises matching pressure and temperature.

According to a particular aspect of the present invention there is provided a method for simulating fluid flow within a three dimensional object having first and second generally opposed surfaces including:

matching each element of said first surface with an element of said second surface between which a thickness may be defined, wherein matched elements of said first surface constitute a first set of matched elements and matched elements of said second surface constitute a second set of matched elements, specifying a plurality of fluid injection points, performing a flow analysis using each set of said matched elements, whereby said injection points are linked to all locations on said first and second surfaces from which flow may emanate such that resulting flow fronts along said first and second surfaces have matched flow rates.

A preferred embodiment of the invention will be described, by way of example, with reference to the accompanying drawings, in which.

Figure 3:
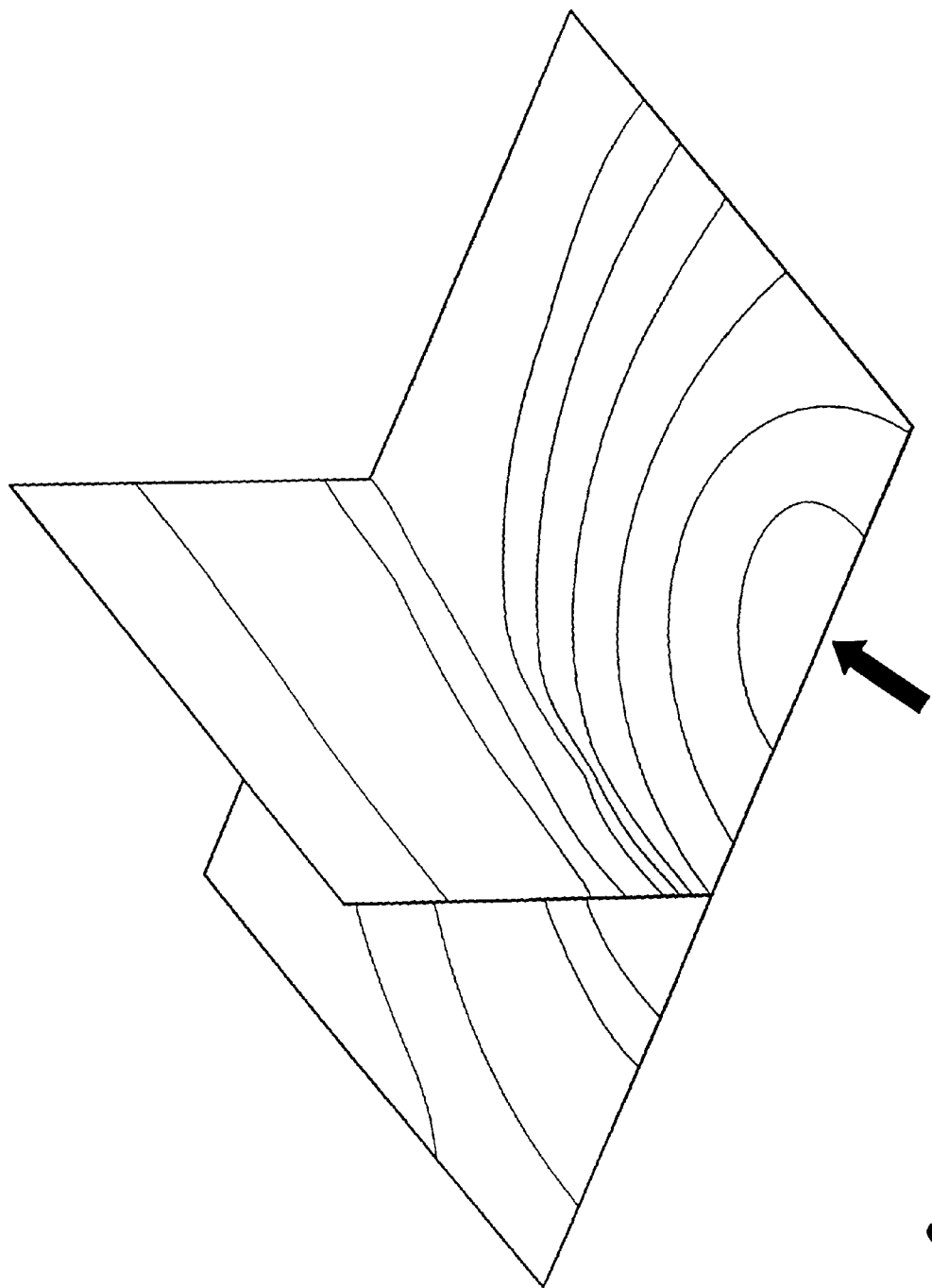
FIG. 3 is a view of the major results from a conventional analysis showing the position of the advancing melt at given times.
Figure 4:
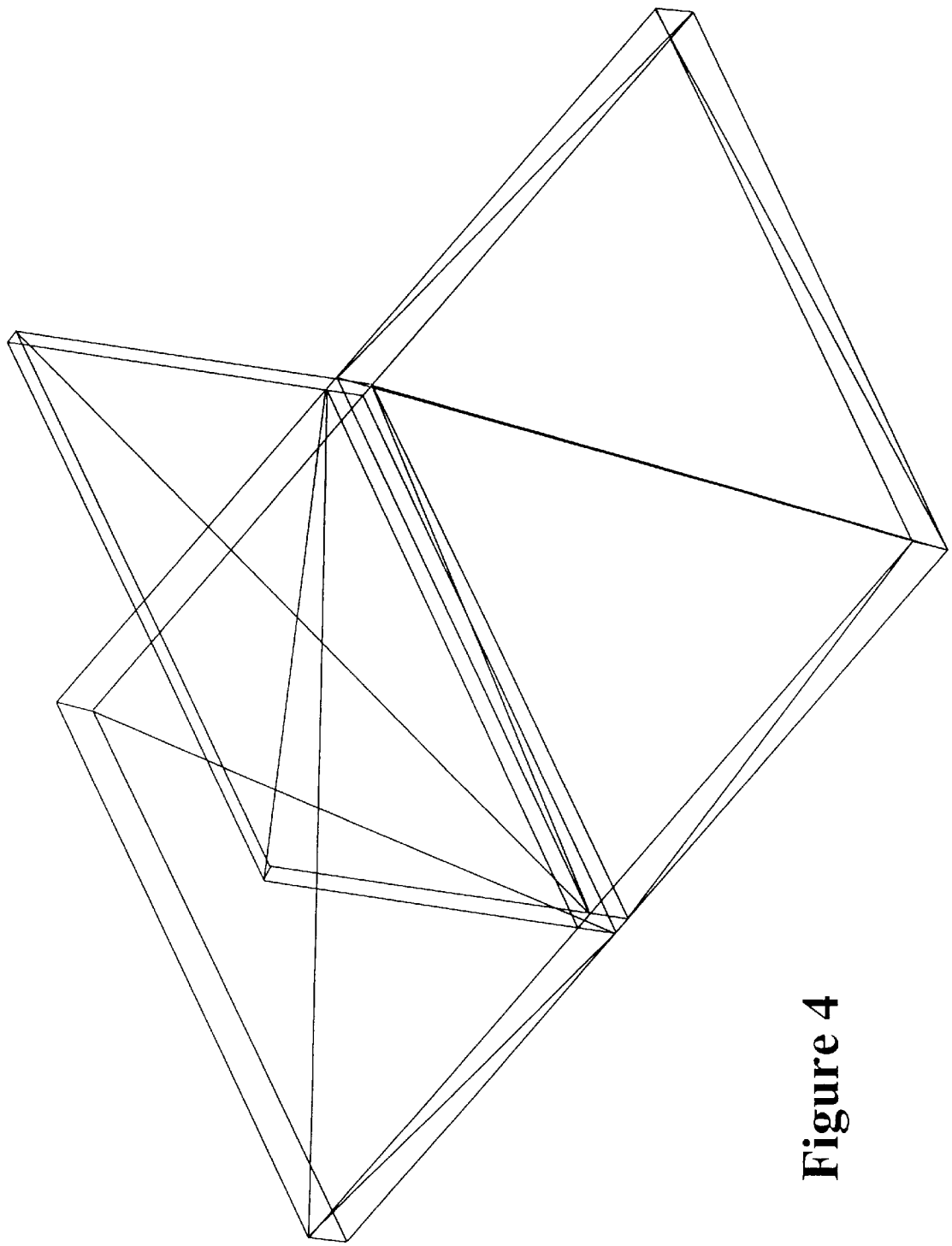
FIG. 4 is an example of a stereolithography mesh of the T-shaped object of FIG. 1.
Figure 5A:
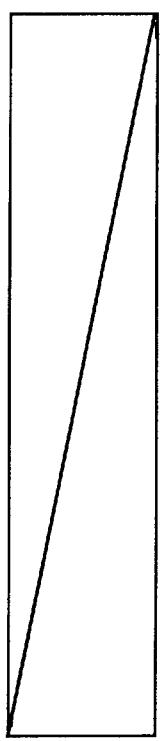
FIG. 5a shows an initial mesh used in a remeshing method according to the present invention.
Figure 5B:
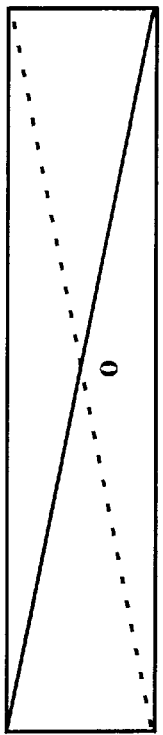
Figure 5C:
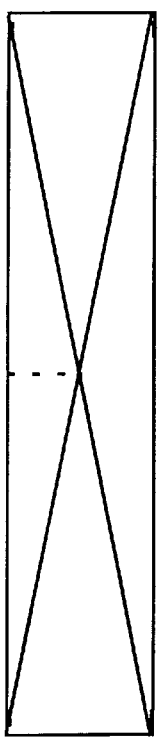
Figure 5D:
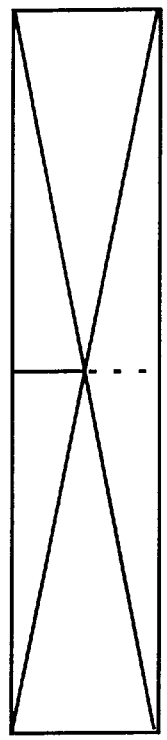
Figure 5E:
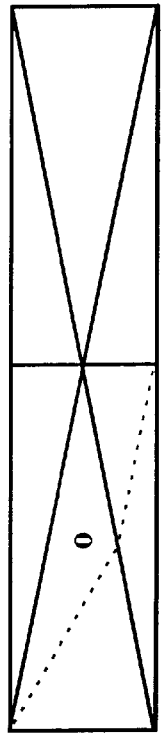
Figure 5F:
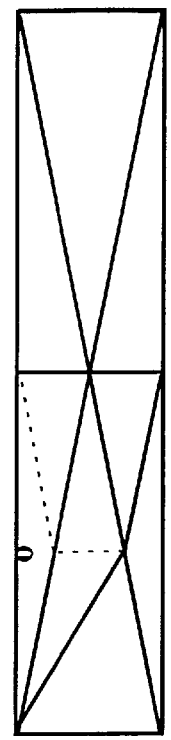
Figure 6:
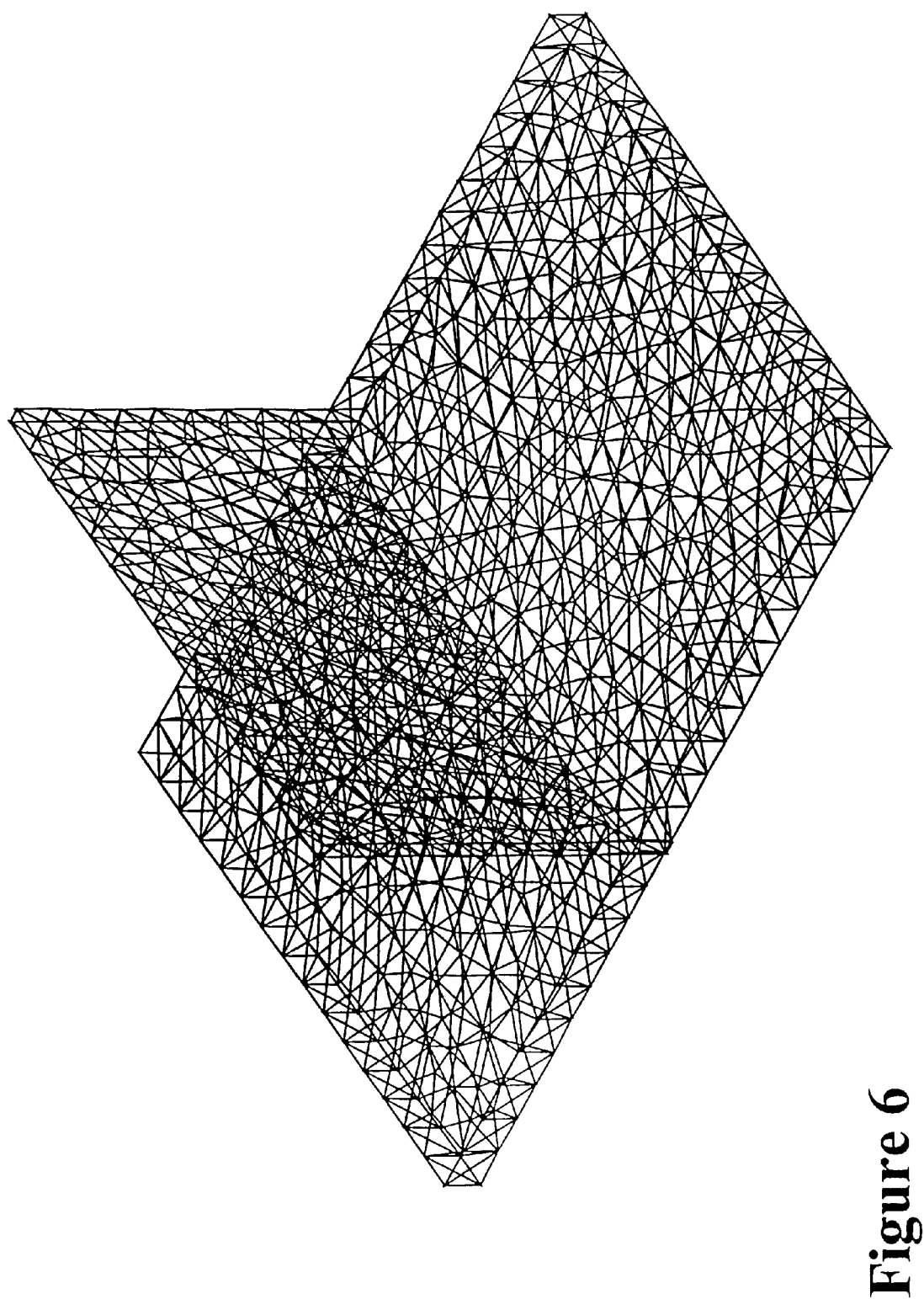
Figure 7A:
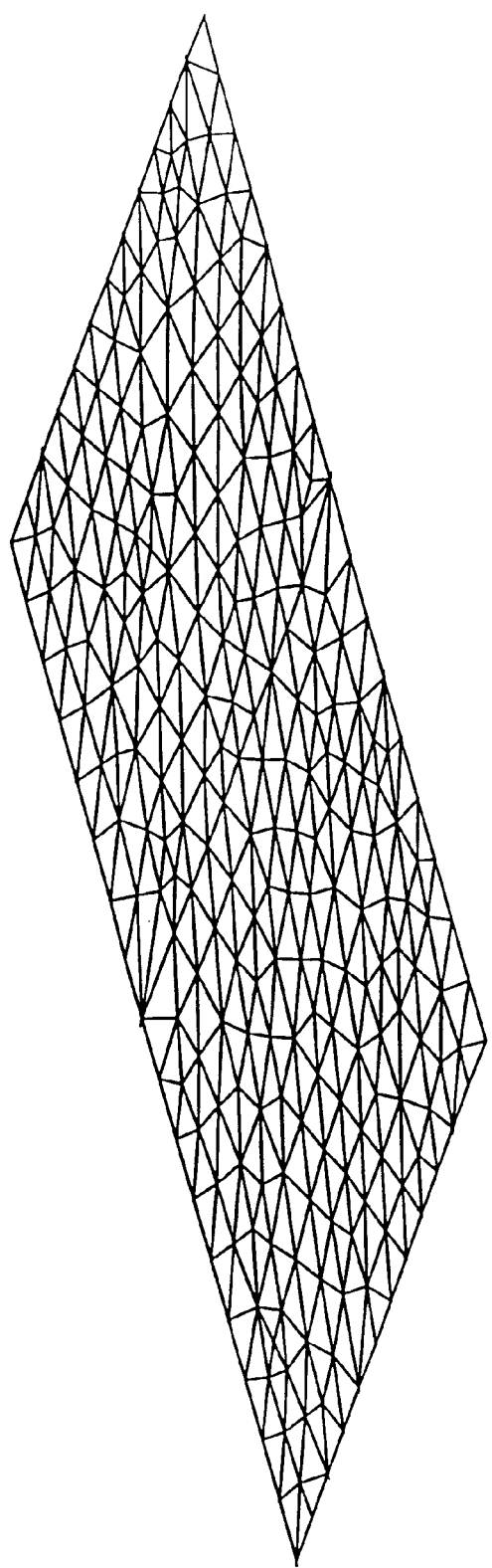
Figure 7B:
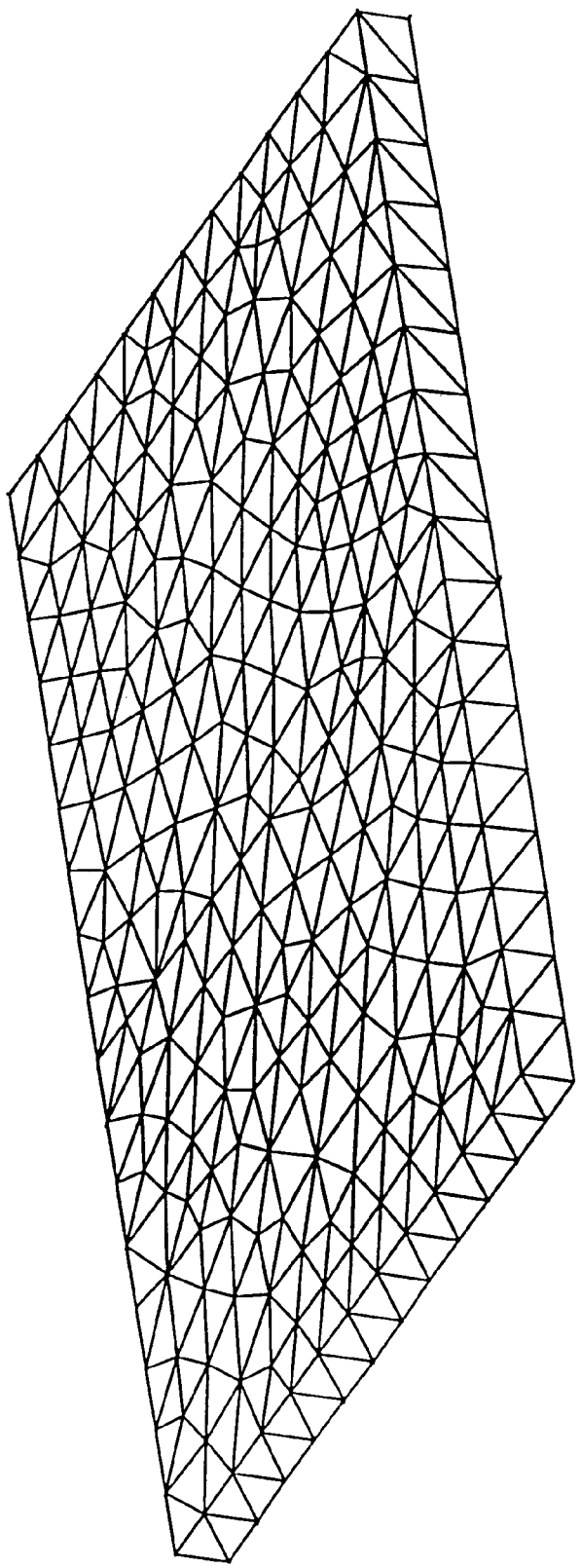
Figure 8:
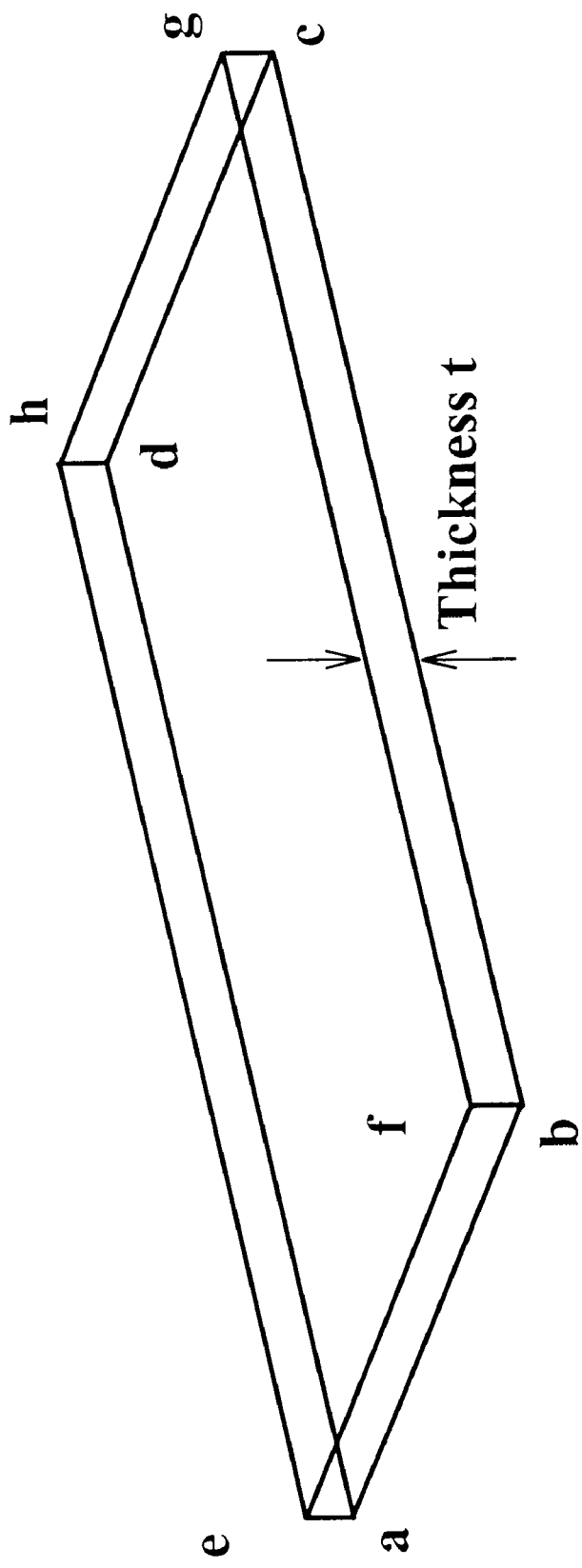
Figure 9:
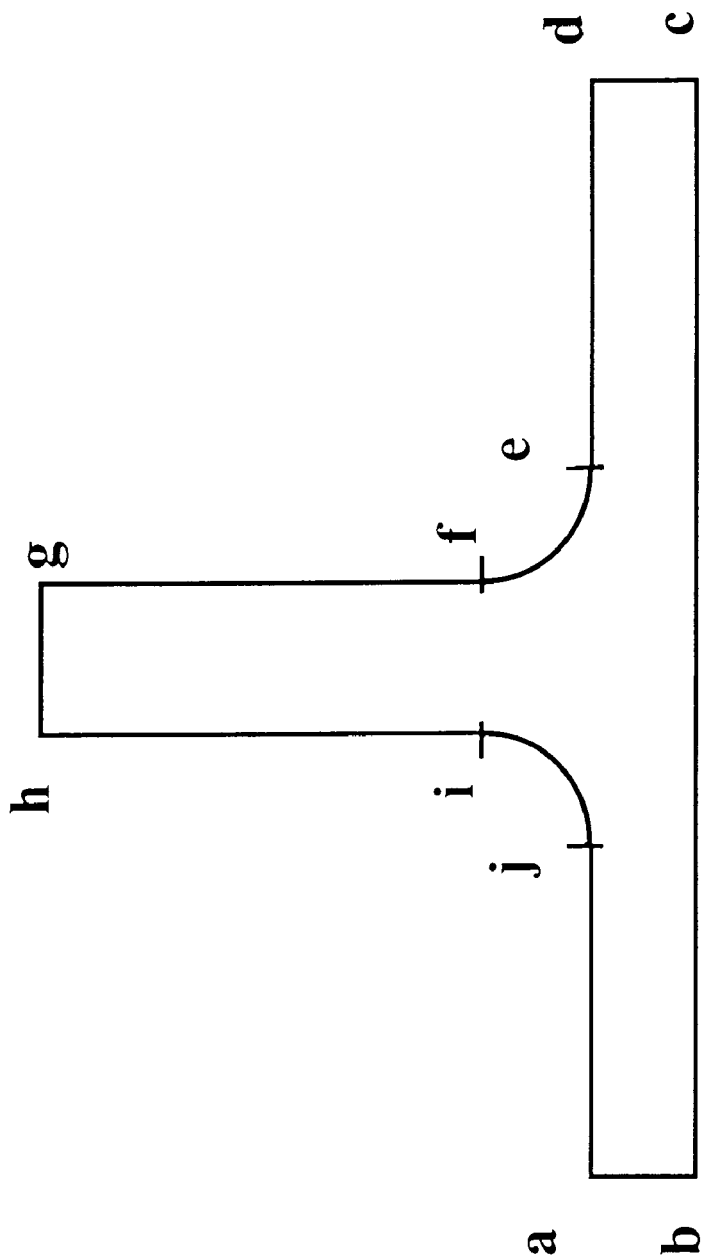
Figure 10:
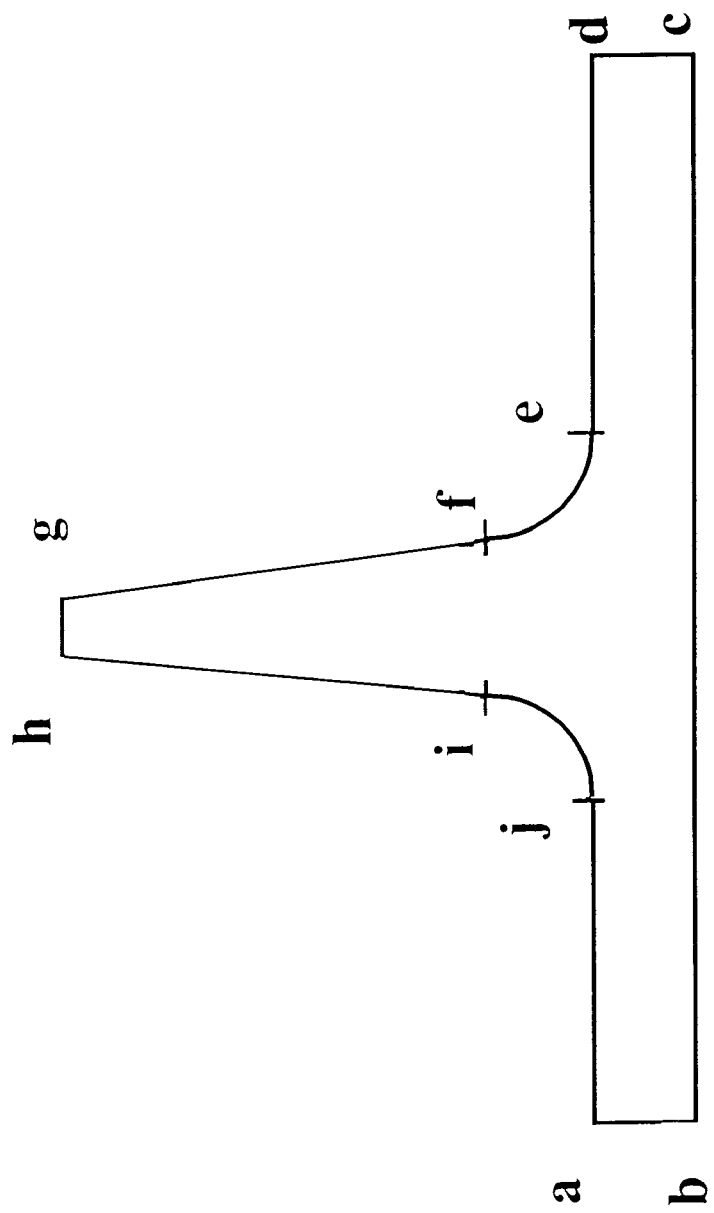
Figure 11:
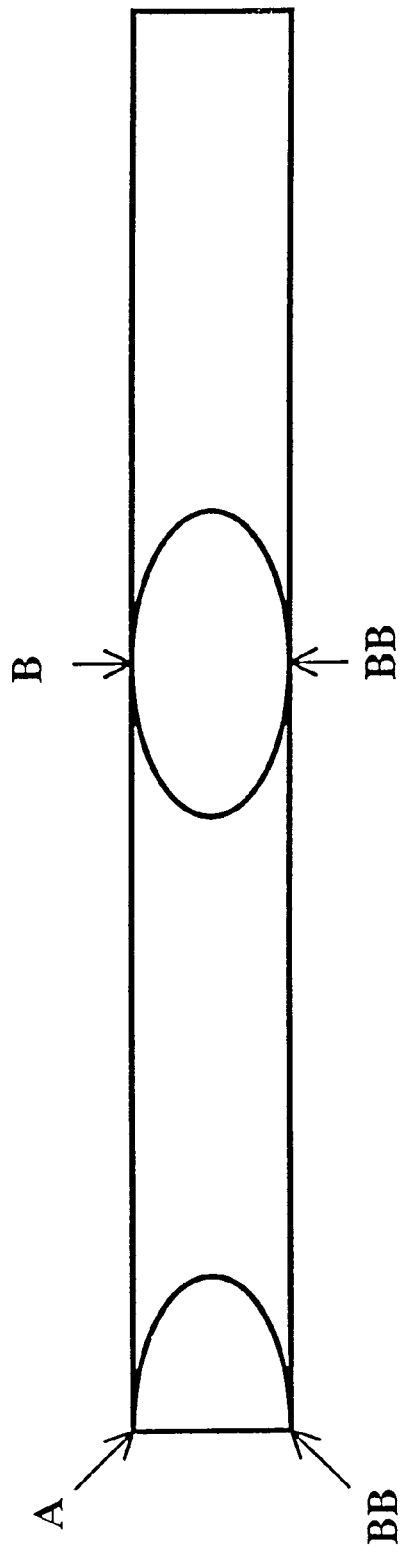
Figure 12:
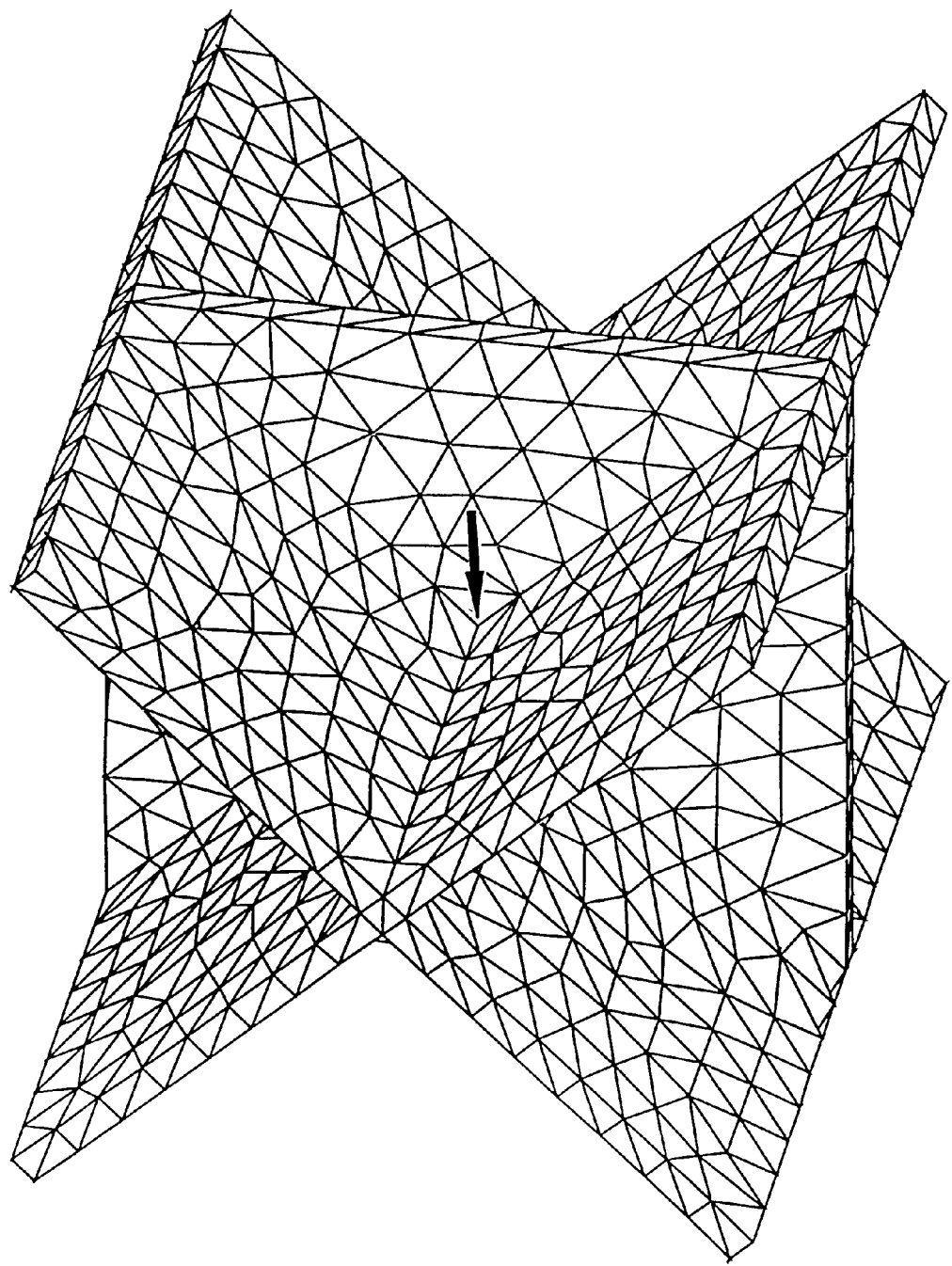
Figure 13:
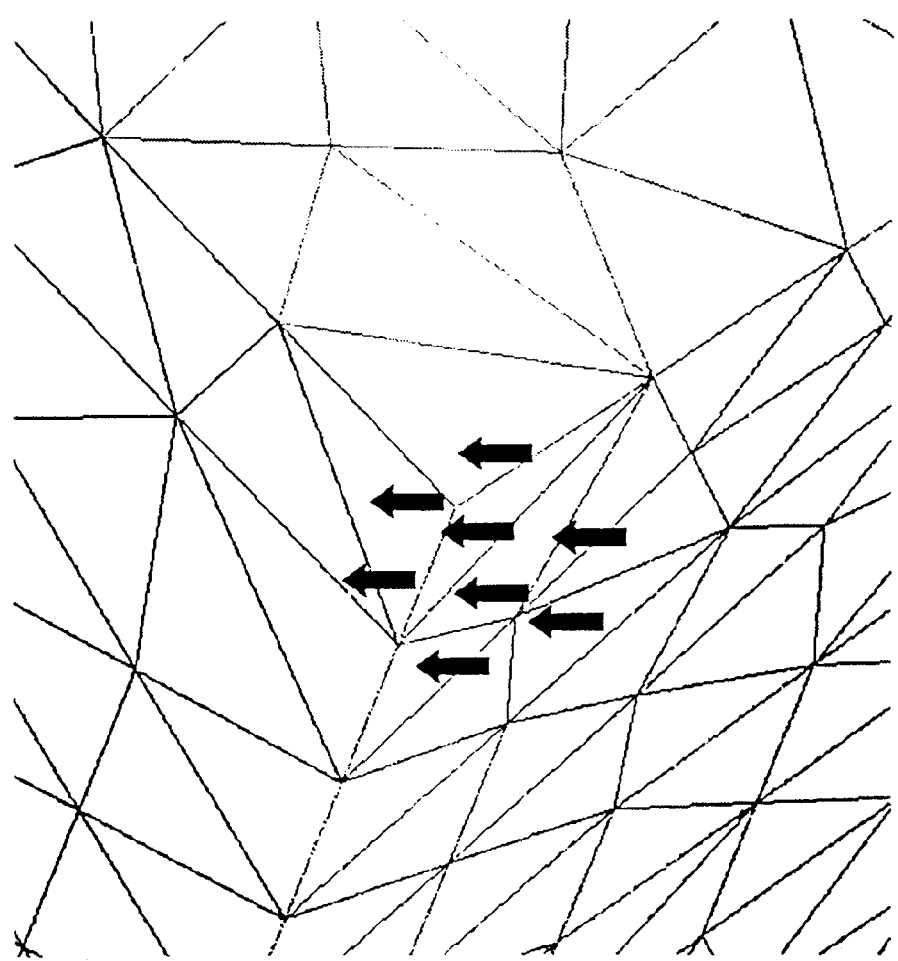
Figure 14:
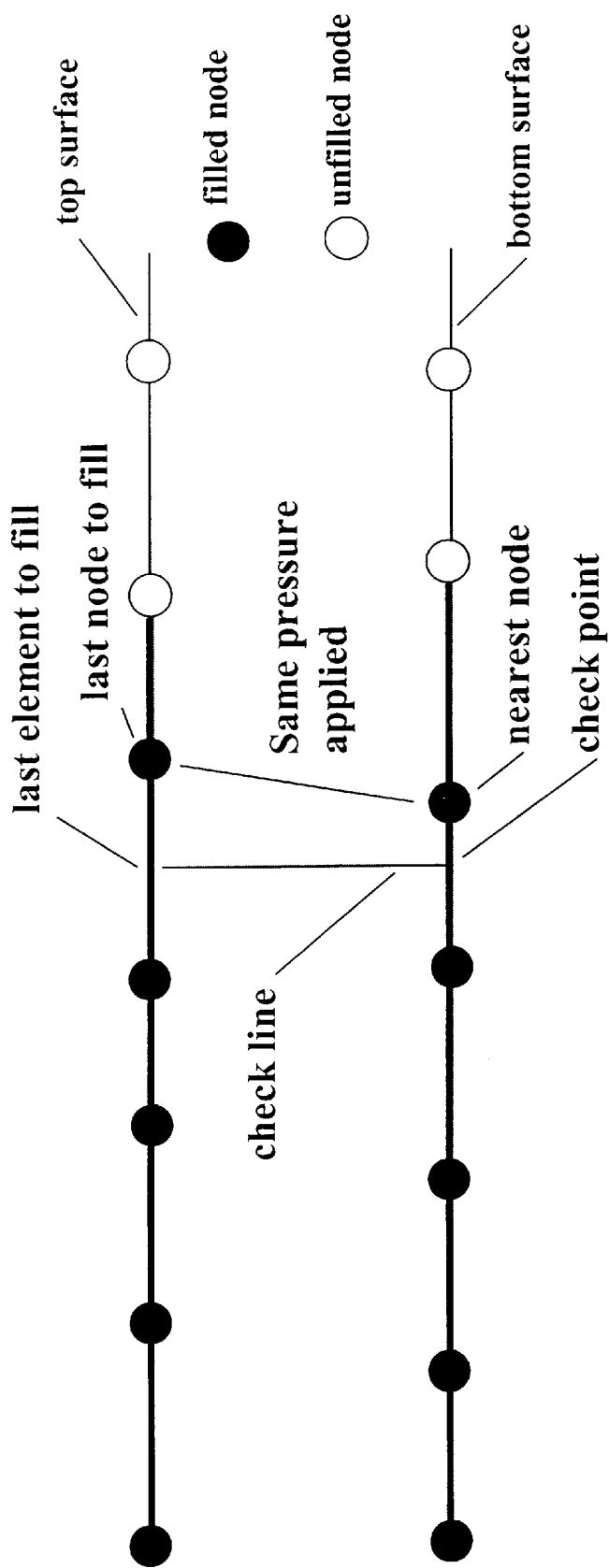
Figure 15:
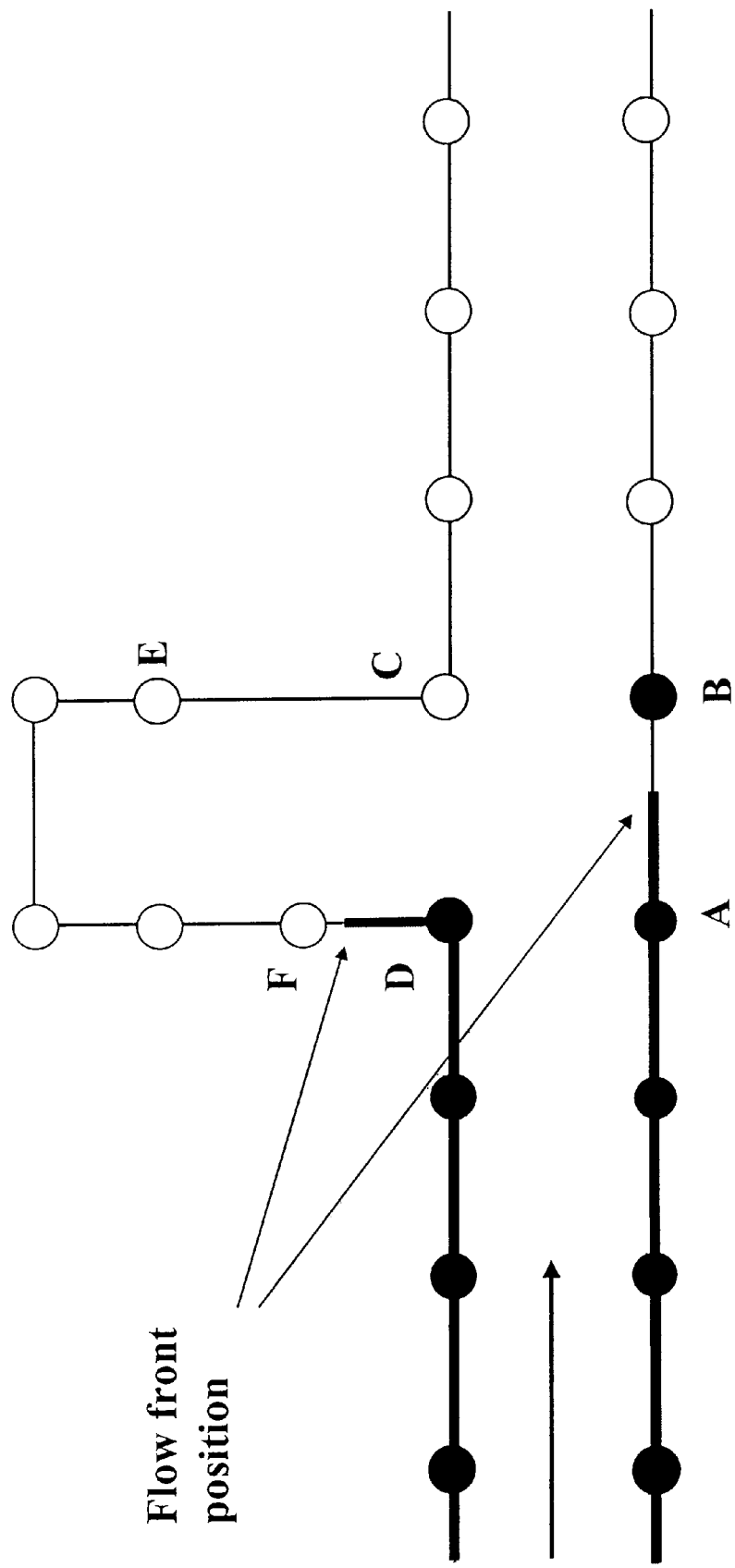
Figure 16:
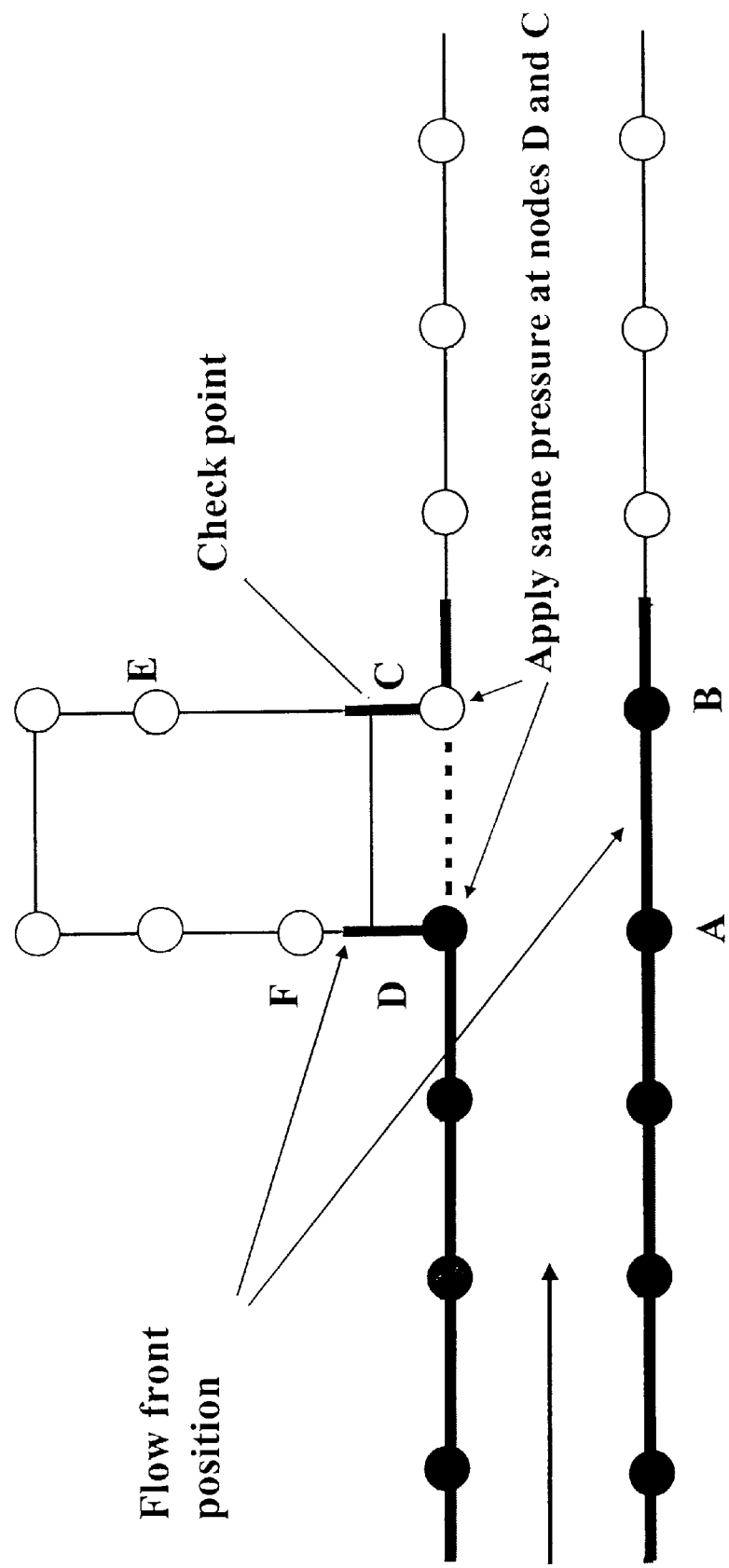
Figure 17:
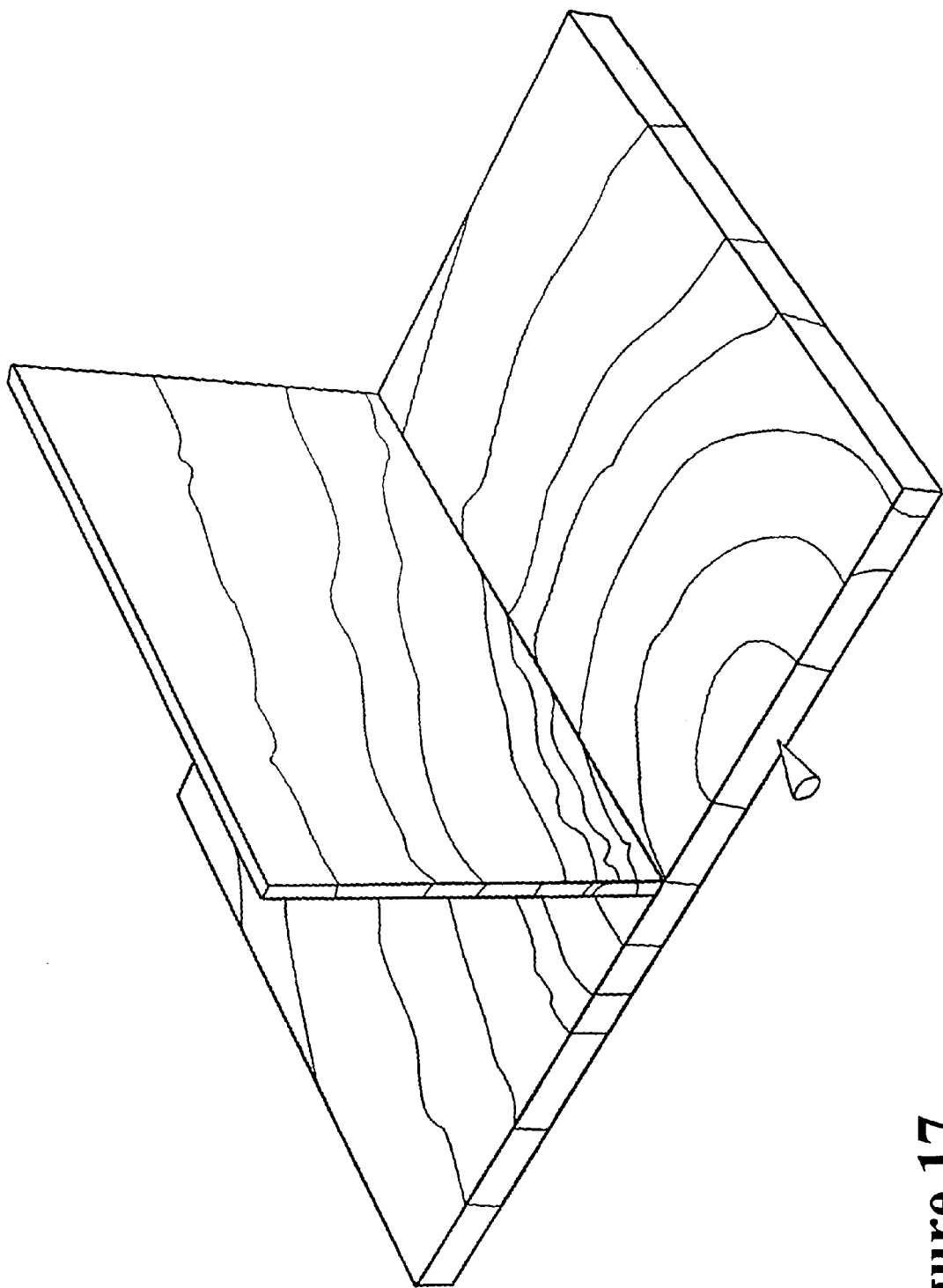

FIGS. 5b–f show the mesh of FIG. 5a progressively remeshed according to the remeshing method;

FIG. 6 shows the mesh of FIG. 4, remeshed according to the preferred embodiment of the present invention;

FIG. 7a is a view of a mesh produced by conventional modelling techniques for a flat plate;

FIG. 7b is a view of a corresponding mesh produced for a flat plate according to a preferred embodiment of the present invention;

FIG. 8 illustrates surface matching for a flat plate according to the preferred embodiment;

FIG. 9 is a view similar to FIG. 8 illustrating in cross-section the edges, matched surfaces and unmatched surfaces of another T-shaped object according to the preferred embodiment;

FIG. 10 is a cross-sectional view illustrating the edges, matched surfaces, matched tapered surfaces, unmatched surfaces and unmatched edges of yet another T-shaped object according to the preferred embodiment;

FIG. 11 is a view of a simple object showing injection points;

FIG. 12 is a view of an object comprising intersecting plates with a user selected injection point according to the preferred embodiment;

FIG. 13 is a enlarged view of the object of FIG. 12 showing the injection points required to allow flow to emanate correctly from the selected point according to the preferred embodiment;

FIG. 14 is a cross-section of a plate, with a flow front advancing from the left and leading a little on the top surface according to the preferred embodiment;

FIG. 15 illustrates in a cross-sectional view the synchronization of flow in a ribbed plate, with the flow splitting and also filling a vertical rib according to the preferred embodiment;

FIG. 16 illustrates in a cross-sectional view the assignment of identical pressures at nodes to synchronize flow fronts at a rib according to the preferred embodiment; and FIG. 17 is a view similar to FIG. 3 generated according to the preferred embodiment of the present invention.

A method for simulating fluid flow within a three dimensional object according to the present invention involves three main steps:

1) Preparation of geometry,
2) Selection of injection points, and
3) Analysis.

Before these steps are effected, however, the input for the simulation is prepared. Mesh generators for producing finite element meshes are generally an expensive addition to the base CAD system. Consequently many CAD installations have no finite element analysis (FEA) mesh generation capability. In order to facilitate the implementation of the invention, the method has been designed to avoid the need for a mesh generator. This is done by using the type of mesh available for stereolithography. Stereolithography, a prototyping technology that is widely employed in industry, is used to produce prototype components for assembly or evaluation. It requires a stereolithography apparatus and takes as input a computer file known as a "SLA" file. The ability to output SLA files is common in CAD systems. However, the type of triangulation created is not good enough for FEA. Characteristic of the SLA file is the inclusion of several very long, narrow triangles of high aspect ratio as shown in FIG. 4.

A method in accordance with the present invention includes, therefore, a remeshing algorithm (or remesher) that uses as input the triangles from a stereolithography SLA (or similar) file and remeshes to produce a mesh that may be used in analysis.

There are several steps involved in the input of a stereolithography mesh and its refinement into elements for analysis. These steps are:

Input of mesh,
Checking of mesh,
Classification of mesh into surfaces, and
Remeshing.

Each of these is described below.

Input of Mesh

In the preferred embodiment, the input mesh is of the form used for stereolithography. Alternatively, however, the input could be IGES surfaces (which would then be meshed internally), a surface mesh of quadrilaterals or a mix of quadrilaterals and triangles, tetrahedral or hexahedral meshes.

Checking of mesh

The input mesh is checked to ensure that it is closed and orientable. The mesh is consistently oriented so that a unit normal to each element points outward from the internal volume defining the solid region that represents the object or part being modelled. The volume of this region and the surface area of the mesh are calculated and stored. The number of parts defined by the input mesh is also determined.

Classification of mesh into surfaces

The following properties for each element in the mesh are noted or calculated, and stored:

Area,

Normal at the element centroid,

Edge lengths of the element,

Internal angles at the vertices of the elements,

Adjacent elements (the elements attached to each side of the element under consideration), and Bending angle between adjacent elements (the angle between normals of adjacent elements). Nodal properties are then noted, calculated and stored.

These are:

Measure of minimum curvature (calculated by looking at the elements attached to a node and noting the angle between each adjacent pair of elements, whereby the measure of minimum curvature is then the smallest such angle between attached pairs of elements), Connecting elements (the set of elements connected to the node), and Number of edges connected to the node.

Surface edges are then calculated using a value of bending angle to group elements into surfaces. Surfaces so formed are then classified into planar surfaces, and low curvature surfaces.

Further classification is then done to produce high curvature surfaces and edges. The following properties of edges are noted or calculated and stored:

Length,

Bending angle,

Direction of bending (in or out), and

Adjacent Elements.

Surface loops are then created. These are defined to be the oriented edges of surfaces. It should be noted that a surface with a hole in it will have two associated loops—one for the outer edges and one describing the interior hole. Loop properties are then noted or calculated and stored:

Length, and

Edges connected to loop.

The following surface properties are noted or calculated and stored:

Perimeter,

Area,

Nodes in surface,

Elements in surface,

Edges, and

Minimum measure of curvature.

Remeshing

With the surfaces classified, the mesh associated with each surface is refined using a bisection algorithm which bisects the longest side of a triangle and creates extra elements. This is illustrated in FIGS. 5a–f. FIG. 5a shows the initial mesh. The mesh is refined by defining a node at the mid point of the longest element side and extending lines to vertices to define extra triangles. In FIGS. 5b to 5f, the midpoint of the longest side (denoted by o) and the dotted lines extending from this point define the new elements. Remeshing continues until the elements satisfy a criterion on size.

The result of the remeshing algorithm when applied to the mesh shown in FIG. 4 is shown in FIG. 6. In this regard the ideal triangle is equilateral: it may be seen that the triangles in FIG. 6 are far more uniform and closer to this ideal.

The method will thus accept as input stereolithography files (usually generated with a ".stl" filename extension) and other files that are similar such as "render" files (produced by "Pro-Engineer" with a ".slp" extension).

In practice any file format that describes a mesh (of, for example, a lattice or quadrilaterals) covering the outer surfaces of the solid region may be us ed as input to the invention. The remesher is always used to improve the mesh quality and produce the triangular mesh for subsequent processing.

The first step is then the preparation of the geometry, in which the geometry of the three dimensional CAD solid model is processed by conventional techniques to provide a surface mesh covering the outer surfaces of a solid body, rather than a midplane mesh as required by the conventional simulation approach. This distinction is depicted in FIGS. 7a and 7b. FIG. 7a shows the midplane mesh for a simple plate required by the conventional technique, whereas FIG. 7b shows the mesh employed according to the present invention for the same object. Further, the flow front must be synchronized on both sides of the surface in which the material flows. The flow fronts are said to be 'synchronized' when the positions of the fronts along each of the two opposed surfaces are the same, or essentially the same, so that the simulation does not become 'unphysical.' As will be appreciated by those skilled in the art, in the flow of a real fluid through a real solid the flow fronts along the opposed surfaces of the solid will generally advance at the same (or essentially the same rate), and hence have the same (or essentially the same) position on those surfaces. In a preferred embodiment of the present invention, this condition is met by requiring that the pressure at pairs of matched points (or nodes) on the two surfaces have the same pressure. Synchronization so obtained or maintained is referred to as 'pressure synchronization.' In an alternative embodiment, 'temperature synchronization' may be used together with pressure synchronization; this combined pressure and temperature synchronization is referred to in the art as 'matching pressure and temperature.' In temperature synchronization, synchronization is maintained by requiring the identity of the temperature distribution assigned to both nodes of each pair of nodes. The temperature distribution, although assigned to a node or point, represents the temperature distribution across the gap between the opposed surfaces. If material is injected at the centre of the plate, then, in the conventional case, the material flows to the boundary of the part or object and stops without any difficulty. For the surface mesh on the solid model (FIG. 7b) the material will flow to the outer edge, across the edge and then under the top surface. This is clearly not indicative of the physical phenomenon of flow in a plate and so, according to the invention, there are imposed some constraints on the flow when using the surface mesh. These constraints are that the injection point must link to all surfaces from which flow will emanate and the flow front must be synchronized along the top and bottom meshes of the surface mesh. Preferably this link is established from the commencement of the flow analysis, but a successful (if somewhat less accurate) analysis of the flow can still be performed is this linking commences subsequently. To perform these tasks the surface mesh must be categorized into surfaces which are then further classified to facilitate injection node selection and synchronization. Thus, according to the present invention, the surface mesh is then grouped into individual surfaces and classified. The categories of surfaces are:

Matched,

Unmatched, and

Edges.

Matched surfaces are defined to be those that have a relationship with another surface such that a notion of thickness between them can be sensibly defined. FIG. 8 illustrates this idea. Surfaces abcd and efgh may clearly be associated so that the thickness t between them is defined. Surfaces abfe, bcgf, cdhg and daeh are edge surfaces and unmatched.

FIG. 9 further clarifies these concepts. This figure shows a cross-section through a filleted rib. Here ab, cd and gh are on edge surfaces. Lines aj and ed are matched to bc, fg and hi are matched and the curved sections ij and ef are unmatched. It should be noted that it is not possible to sensibly define a thickness of unmatched surfaces in the manner described above. As a final example, FIG. 10 illustrates a tapered rib cross-section. Here ab, cd and gh are edges as in FIG. 9. Lines aj and ed are matched to line bc, and the curved lines ef and ij are unmatched as in FIG. 9. However fg and hi are still considered matched despite the taper. Clearly, if the taper is extreme it is possible that the surfaces forming the tapered ribs may not be matched.

When surfaces have been classified it is possible to assign to elements on matched surfaces a thickness equal to the distance between the surfaces. Elements on edge surfaces are given the thickness of the matched surfaces to which they are attached. Finally elements on unmatched surfaces are given the average thickness of surrounding elements on matched surfaces.

According to the present invention, the mesh on each side of the object is analyzed. A key aspect in this is obtaining a similar flow front on each side of the matched surfaces. As the entry point for flow is the injection node and is selected by the user, the method ensures that, regardless of where the user chooses to inject plastic, all matched surfaces near the point are tied to the injection node. "Tied" implies that the same pressure and temperature of melt at the injection node is given to all other tied nodes.

FIG. 11 shows a cross-section of a rectangular plate. Point A is where the user chooses to inject plastic, point AA is the corresponding point on the other side of the surface. Point AA is automatically determined in accordance with the invention using the information from the classification of surfaces described above. Injection at this point ensures that the flow is matched on top and bottom surfaces. Similarly, point B is the point chosen by the user and BB is the corresponding point determined by the method in accordance with the invention to ensure that flow is matched along top and bottom surfaces.

The selection of injection node(s) can be quite complex. This is illustrated in FIG. 12, which shows an object composed of intersecting plates. The small arrow near the point of intersection of the plates indicates the user selected injection point. FIG. 13 is an enlarged view of the injection area and shows the actual injection points required to allow the flow to emanate correctly from the selected point. In this case eight injection points are required one of which is supplied by the user and the other seven are determined by the invention.

This method identifies which points need to be linked to the selected injection point with the concept of matching. For a given injection point specified by the user, a set consisting of all surfaces which are matched to all surfaces connected to the injection point is defined. The following steps are then performed:

1. For each surface in this set, the point closest to the selected injection point is noted. These closest points form a set of points that are potentially to be linked to the user selected injection point.
2. Each member of the set of potential injection points is checked to see if it is already an injection point specified by the user. If it has already been so determined, it is omitted from the set.
3. For each potential injection point remaining, a set consisting of all surfaces which are matched to all surfaces connected to the potential injection point is defined.

These steps are repeated until the set of potential points is unchanged. The set then forms the set of points to be linked to the user specified injection point.

This procedure may be readily understood for the simple geometry of two crossed plates, for which the user specifies injection at the intersection of the plates. In the event that the surfaces connected to the specified injection point(s) are not matched to any other surfaces, no attempt is made to link other points to the injection point(s). Instead, flow is allowed to emanate until it reaches points attached to surfaces that are matched to opposing surfaces. The flow fronts are then synchronised on the opposing surfaces by assigning links between points on the opposing surfaces in a manner similar to that described above for linking points to the injection point.

Analysis uses a Hele-Shaw type solver. The injection flow rate is approximately double that for the volume of the object as each element in the surface mesh has a thickness equal to the gap thickness and so the mesh volume is approximately double that of the object. The time step for flow front advancement is determined by the geometric connectivity of the control volumes attached to each node.

The solver has the ability to synchronize flow on matched surfaces during analysis. FIG. 14 shows a cross-section of a plate where it is assumed that the flow front is advancing from the left and is leading a little on the top surface. By definition each node may be empty, partially filled or filled. On each time step, whether all the nodes belonging to an element are filled is checked. The instant this occurs the element is defined to be the current last element to fill and a line is drawn from its centroid to its matched element (the matched element is known from the surface classification described above) defining the check point. This "check line" is indicated in FIG. 14. The nearest node to the check point is then assigned the same pressure as the last node to fill, as indicated in FIG. 14. Flow synchronization is done for all matched surfaces and all elements near the flow front (on top and bottom surfaces) are checked at each time step.

Synchronization is not performed on unmatched surfaces.

An example highlighting the role of synchronization is shown in FIG. 15, which shows the cross-section of a ribbed plate. The flow will split physically and fill the vertical rib as well as continuing to the right. Owing to the use of the surface mesh it is necessary to impose synchronization or the flow will continue up through node F to the top of the rib and then down to E and C. This is performed by using matching. Since the element comprising nodes D and F and the element comprising nodes C and E will be matched (as they are associated with matched surfaces) it is possible to assign the same pressures at nodes to synchronize the fronts. This is illustrated in FIG. 16. Here a line from the centroid of the element comprising nodes D and F is constructed to its matched element (comprising nodes C and E) to define the check point. As the nearest node to the check point is C, it is given the same pressure as node D for all subsequent time. Flow now emanates from node C as shown and so the flow goes up the rib on both sides as required. When establishing links for synchronization, links are only made to empty nodes to which are attached only empty nodes.

Figure 1:
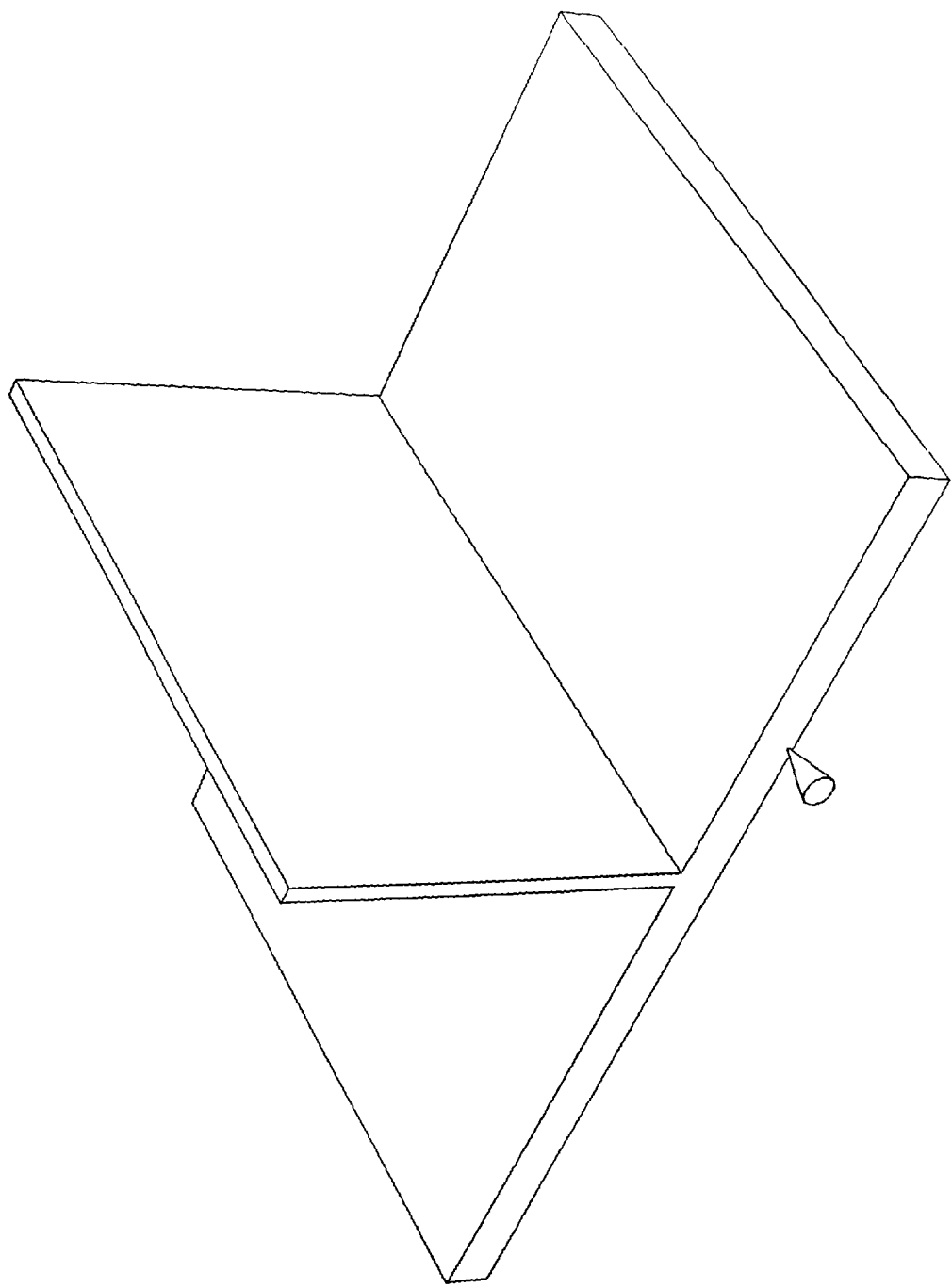
FIG. 1 is a representative example of an article to be manufactured by injection molding in the form of a T-shaped component.
Figure 2:
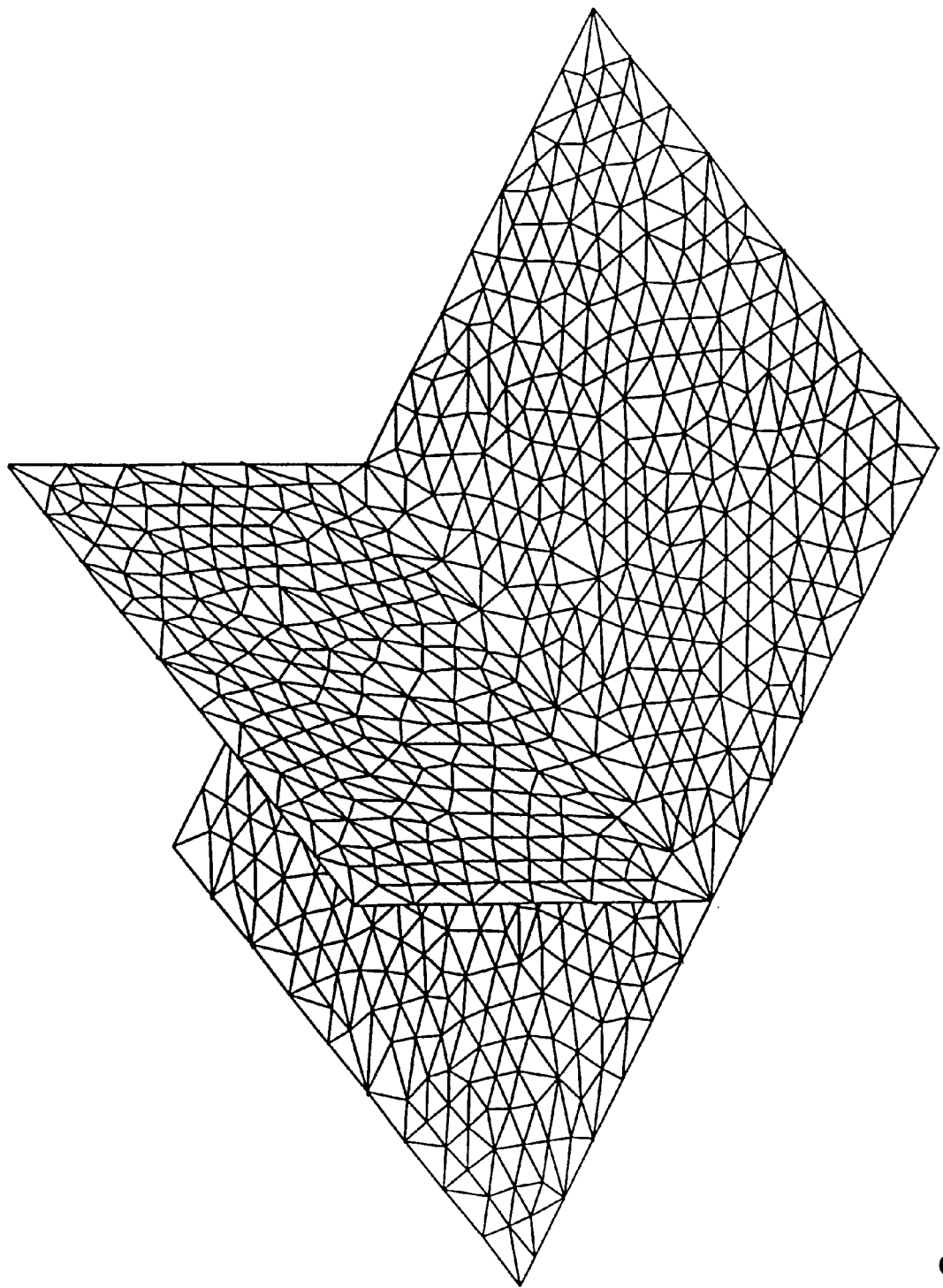
FIG. 2 is a midplane representation of the component in FIG. 1 that is meshed.

A sample result of the analysis according to the present invention is shown in FIG. 17. This figure corresponds to FIG. 3, which shows the results of the comparable, conventional analysis of the same solid model shown in FIG. 1. As the present invention uses a surface mesh rather than a midplane mesh, the results are displayed on the solid model (FIG. 17) rather than on the midplane representation as in conventional analysis (FIG. 3). Apart from being more natural for the operator, the display is visually more meaningful.

Fundamental quantities calculated by the invention, therefore, include:

the position of the melt front at any time (known as "filling contours"), the pressure at the injection node and the pressure distribution throughout the plastic at any time during filling or packing phases (known as a "pressure distribution"), and the temperature of the plastic melt at any point within the part at any time during filling or packing phases (known as a "temperature distribution"). These may be displayed directly or processed to provide derived information to the user of the program, such as distributions of shear rate, shear stress, velocity, viscosity, direction of flow and orientation of reinforcing material. On the basis of this derived information and the fundamental calculated quantity data, changes to the component geometry, position of injection locations (gates), processing conditions used by the injection molding machine or material for molding may be evaluated for their efficacy in improving the quality or manufacturability of the part. This is generally an iterative process in which an analysis is performed, results are considered and changes made to bring about an improvement. Another analysis is then performed to ensure that the changes have indeed improved the results. Frequently changes to the part geometry are revealed. These are made in the CAD system and the revised model is subjected to further analysis. It is this aspect which is assisted by the invention as the need for the designer to recreate a new model for analysis every time a change is made is removed.

Thus, an increase in the speed of evaluating of proposed part shapes is achieved.

Modifications within the spirit and scope of the invention may readily be effected by persons skilled in the art. For example, linking may be performed in alternative methods such as, where multiple injection points are selected by a user, assigning the same flow rate to the linked nodes. It is to be understood, therefore, that this invention is not limited to the particular embodiments described by way of example hereinabove.

What is claimed is:

1. A method for simulating fluid flow within a three dimensional object having first and second generally opposed surfaces including:

matching each element of said first surface with an element of said second surface between which a thickness may be defined, wherein matched elements of said first surface constitute a first set of matched elements and matched elements of said second surface constitute a second set of matched elements, specifying a fluid injection point, performing a flow analysis using each set of said matched elements, whereby said injection point is linked to all locations on said first and second surfaces from which flow may emanate such that resulting flow fronts along said first and second surfaces are synchronized, and outputting at least one result of said flow analysis.

2. A method as claimed in claim 1 wherein any unmatched elements of said first and second surfaces, being elements that could not be matched, are assigned thicknesses being the average of the thicknesses of adjacent matched elements where such adjacent matched elements exist, or of adjacent unmatched elements where such adjacent matched elements do not exist and said adjacent unmatched elements have been assigned thicknesses.

3. A method as claimed in claim 2 wherein each element of an edge surface, being a surface between said first and second surfaces, and adjacent to either of said first or second surface is assigned a thickness proportional to the thickness of the element of said first or second surface to which said element of said edge surface is adjacent.

4. A method as claimed in claim 3 wherein each said element of an edge surface is assigned a thickness between 0.5 and 1.5 times said thickness of the element of said first or second surface to which said element of said edge surface is adjacent.

5. A method as claimed in claim 4 wherein each said element of an edge surface is assigned a thickness between 0.7 and 0.9 times said thickness of the element of said first or second surface to which said element of said edge surface is adjacent.

6. A method as claimed in claim 5 wherein each said element of an edge surface is assigned a thickness 0.75 times said thickness of the element of said first or second surface to which said element of said edge surface is adjacent.

7. A method as claimed in claim 3 wherein each element of an edge surface not adjacent to said first or second surface is assigned a thickness being the average of the thicknesses of adjacent elements of said edge surface that have been assigned thicknesses.

8. A method as claimed in claim 1 further including checking said synchronization of said flow fronts.

9. A method as claimed in claim 8 wherein said flow fronts are synchronized if found not to be or no longer synchronized.

10. A method as claimed in claim 9 wherein said checking is performed at each time step.

11. A method as claimed in claim 1 wherein flow is simulated at a rate directly proportional to a desired flow rate for the object.

12. A method as claimed in claim 11 wherein said rate is proportional to the ratio of computational domain volume of said object to real volume of said object.

13. A method as claimed in claim 12 wherein said rate is equal to the ratio of said computational domain volume to said real volume.

14. A method as claimed in claim 1 wherein said method is performed with first and second representations of said first and second surfaces respectively comprising first and second meshes or lattices respectively, wherein said elements are interstices of said first and second meshes or lattices.

15. A method as claimed in claim 14 wherein said method includes creating said first and second representations.

16. A method as claimed in claim 14 wherein said method includes creating improved representations of said first and second surfaces, whereby said elements are elements of said improved representations and said method is performed with said improved representations.

17. A method as claimed in claim 14 wherein said first and second representations are, or are a part of, a representation or representations for stereolithography of said object.

18. A method as claimed in claim 1 wherein said elements are triangular.

19. A method as claimed in claim 18 wherein said elements are equilateral.

20. A method as claimed in claim 1 wherein said injection point is first linked to all said locations from the commencement of said flow analysis.

21. A method as claimed in claim 1 wherein said injection point remains linked to all said locations at all times in said flow analysis subsequent to being first so linked.

22. A method as claimed in claim 1 wherein said injection point is one of a plurality of injection points.

23. A method as claimed in claim 1 wherein said first and second generally opposed surfaces are one of a plurality of pairs of generally opposed surfaces.

24. A method as claimed in claim 1 wherein said elements are quadrilateral.

25. A method as claimed in claim 1 wherein said method is performed by a computer running a computer program encoding said method for simulating fluid flow.

26. A method as claimed in claim 1 wherein said method includes corrections for non-isothermal temperature fields and/or non-Newtonian fluids.

27. A computing device provided with or running a computer program encoding a method for simulating fluid flow as claimed in claim 1.

28. A computer storage medium provided with a computer program embodying a method for simulating fluid flow as claimed in claim 1.

29. A method as claimed in claim 1 wherein said synchronization comprises matching pressure and temperature.

30. A method as claimed in claim 1 wherein said at least one result is indicative of at least one of the quantities: melt front position; pressure; temperature; time; shear rate; shear stress; velocity; viscosity; direction of flow; orientation of reinforcing materials; flow rate; and any quantity derived from at least one of said quantities.

31. A method as claimed in claim 1 further comprising using said at least one result in controlling an injection molding process.

32. A method for simulating fluid flow within a three dimensional object having first and second generally opposed surfaces including:

providing or creating first and second representations of said first and second surfaces respectively, creating first and second improved representations from said first and second representations respectively, matching each element of said first improved representation of said first surface with an element of said second improved representation of said second surface between which a thickness may be defined, wherein matched elements of said first improved representation constitute a first set of matched elements and matched elements of said second improved representation constitute a second set of matched elements, specifying a fluid injection point, performing a flow analysis using each set of said matched elements, whereby said injection point is linked to all locations on said first and second improved representations from which flow may emanate such that resulting flow fronts along said first and second improved representations are synchronized, and outputting at least one result of said flow analysis.

33. A method as claimed in claim 32 wherein said first and second representations are, or are a part of, a representation or representations for stereolithography of said object.

34. A method as claimed in claim 32 wherein said first and second improved representations comprise small equilateral triangular elements.

35. A method as claimed in claim 32 wherein said at least one result is indicative of at least one of the quantities: melt front position; pressure; temperature; time; sheer rate; sheer stress; velocity; viscosity; direction of flow; orientation of reinforcing materials; flow rate; and any quantity derived from at least one of said quantities.

36. A method as claimed in claim 32, wherein said synchronization comprises matching pressure and temperature.

37. A method as claimed in claim 32 further comprising using said at least one result in controlling an injection molding process.

38. A method for simulating fluid flow within a three dimensional object having first and second generally opposed surfaces including:

matching each element of said first surface with an element of said second surface between which a thickness may be defined, wherein matched elements of said first surface constitute a first set of matched elements and matched elements of said second surface constitute a second set of matched elements and said elements are equilateral triangles, specifying a fluid injection point, performing a flow analysis using each set of said matched elements, whereby said injection point is linked to all locations on said first and second surfaces from which flow may emanate such that resulting flow fronts along said first and second surfaces are synchronized, wherein said first and second representations are, or are a part of, a representation or representations for stereolithography of said object, and outputting at least one result of said flow analysis.

39. A method as claimed in claim 38 wherein said injection point is one of a plurality of injection points.

40. A method as claimed in claim 38 wherein said at least one result is indicative of at least one of the quantities: melt front position; pressure; temperature; time; sheer rate; sheer stress; velocity; viscosity; direction of flow; orientation of reinforcing materials; flow rate; and any quantity derived from at least one of said quantities.

41. A method as claimed in claim 38 further comprising using said at least one result in controlling an injection molding process.

42. A method for simulating fluid flow within a three dimensional object having first and second generally opposed surfaces including:

matching each element of said first surface with an element of said second surface between which a thickness may be defined, wherein matched elements of said first surface constitute a first set of matched elements and matched elements of said second surface constitute a second set of matched elements, specifying a fluid injection point, performing a flow analysis using each set of said matched elements, synchronizing flow fronts resulting from said flow analysis along said first and second surfaces, and outputting at least one result of said flow analysis.

43. A method as claimed in claim 42 wherein any unmatched elements of said first and second surfaces, being elements that could not be matched, are assigned thicknesses being the average of the thicknesses of adjacent matched elements where such adjacent matched elements exist, or of adjacent unmatched elements where such adjacent matched elements do not exist and said adjacent unmatched elements have been assigned thicknesses.

44. A method as claimed in claim 43 wherein each element of an edge surface, being a surface between said first and second surfaces, and adjacent to either of said first or second surface is assigned a thickness proportional to the thickness of the element of said first or second surface to which said element of said edge surface is adjacent.

45. A method as claimed in claim 44 wherein each said element of an edge surface is assigned a thickness between 0.5 and 1.5 times said thickness of the element of said first or second surface to which said element of said edge surface is adjacent.

46. A method as claimed in claim 45 wherein each said element of an edge surface is assigned a thickness between 0.7 and 0.9 times said thickness of the element of said first or second surface to which said element of said edge surface is adjacent.

47. A method as claimed in claim 46 wherein preferably each said element of an edge surface is assigned a thickness 0.75 times said thickness of the element of said first or second surface to which said element of said edge surface is adjacent.

48. A method as claimed in claim 47 wherein each element of an edge surface not adjacent to said first or second surface is assigned a thickness being the average of the thicknesses of adjacent elements of said edge surface that have been assigned thicknesses.

49. A method as claimed in claim 42 wherein flow is simulated at a rate directly proportional to a desired flow rate for the object.

50. A method as claimed in claim 49 wherein said rate is proportional to the ratio of computational domain volume of said object to real volume of said object.

51. A method as claimed in claim 50 wherein said rate is equal to the ratio of said computational domain volume to said real volume.

52. A method as claimed in claim 42 further comprising checking said synchronization of said flow fronts.

53. A method as claimed in claim 52 wherein said flow fronts are synchronized if found not to be or no longer synchronized.

54. A method as claimed in claim 52 wherein said checking is performed at each time step.

55. A method as claimed in claim 42 wherein said method is performed with first and second representations of said first and second surfaces respectively comprising first and second meshes or lattices respectively, wherein said elements are interstices of said first and second meshes or lattices.

56. A method as claimed in claim 42 wherein said elements are triangular.

57. A method as claimed in claim 56 wherein said elements are substantially equilateral.

58. A method as claimed in claim 55 wherein said method includes creating said first and second representations.

59. A method as claimed in claim 55 wherein said method includes creating improved representations of said first and second surfaces, whereby said elements are elements of said improved representations and said method is performed with said improved representations.

60. A method as claimed in claim 55 wherein said first and second representations are, or are a part of, a representation or representations for stereolithography of said object.

61. A method as claimed in claim 42 wherein said flow fronts are synchronized from the commencement of said flow analysis.

62. A method as claimed in claim 42 wherein said flow fronts are first synchronized after the commencement of said flow analysis.

63. A method as claimed in claim 42 wherein said injection point remains linked to all said locations at all times in said flow analysis subsequent to being first so linked.

64. A method as claimed in claim 42 wherein said injection point is one of a plurality of injection points.

65. A method as claimed in claim 42 wherein said first and second generally opposed surfaces are one of a plurality of pairs of generally opposed surfaces.

66. A method as claimed in claim 42 wherein said elements are quadrilateral.

67. A method as claimed in claim 42 wherein said method is performed by a computer running a computer program encoding said method for simulating fluid flow.

68. A method as claimed in claim 42 wherein said method includes corrections for non-isothermal temperature fields and/or non-Newtonian fluids.

69. A method as claimed in claim 42, wherein said synchronization comprises matching pressure and temperature.

70. A method as claimed in claim 42 wherein said at least one result is indicative of at least one of the quantities: melt front position; pressure; temperature; time; sheer rate; sheer stress; velocity; viscosity; direction of flow; orientation of reinforcing materials; flow rate; and any quantity derived from at least one of said quantities.

71. A method as claimed in claim 42 further comprising using said at least one result in controlling an injection molding process.

72. A method for simulating fluid flow within a three dimensional object having first and second generally opposed surfaces including:

matching each element of said first surface with an element of said second surface between which a thickness may be defined, wherein matched elements of said first surface constitute a first set of matched elements and matched elements of said second surface constitute a second set of matched elements, specifying a fluid injection point, performing a flow analysis using said first set of matched elements, adapting said flow analysis to said second set of matched elements, synchronizing flow fronts resulting from said flow analysis and said adaptation of said flow analysis along said first and second surfaces, and outputting at least one result of said flow analysis.

73. A method as claimed in claim 72 wherein said elements are triangular.

74. A method as claimed in claim 73 wherein said elements are equilateral.

75. A method as claimed in claim 72 wherein said method is performed with first and second representations of said first and second surfaces respectively comprising first and second meshes or lattices respectively, wherein said elements are interstices of said first and second meshes or lattices.

76. A method as claimed in claim 72 wherein said elements are quadrilateral.

77. A method as claimed in claim 72 wherein said method includes creating said first and second representations.

78. A method as claimed in claim 72 wherein said method includes creating improved representations of said first and second surfaces, whereby said elements are elements of said improved representations and said method is performed with said improved representations.

79. A method as claimed in claim 72 wherein said at least one result is indicative of at least one of the quantities: melt front position; pressure; temperature; time; sheer rate; sheer stress; velocity; viscosity; direction of flow; orientation of reinforcing materials; flow rate; and any quantity derived from at least one of said quantities.

80. A method as claimed in claim 72 further comprising using said at least one result in controlling an injection molding process.

81. A method for modelling a three dimensional object including:
   specifying first and second generally opposed surfaces of said object,
   forming first and second representations of said first and second surfaces respectively, wherein said first and second representations each comprise a plurality of elements,
   designating element pairs each comprising an element of said first surface and an element of said second surface between which a thickness may be defined, so as to ascribe a respective element thickness to each element of each respective element pair, and
   using the respective element thicknesses ascribed to the elements of said element pairs in outputting a model of said three dimensional object.

82. A method as claimed in claim 81 wherein any unpaired elements of said first and second surfaces are ascribed an element thickness based on an average of the element thicknesses of surrounding elements of said element pairs.

83. A method as claimed in claim 82 wherein any element of said first and second surfaces that has not been ascribed an element thickness is ascribed an element thickness based on an average of the thicknesses of adjacent elements of said element pairs where such adjacent element pairs exist, or of adjacent unpaired elements where such adjacent element pairs do not exist and said adjacent unpaired elements have been ascribed element thicknesses.

84. A method as claimed in claim 83 wherein each element of an edge surface between said first and second surfaces, and adjacent to either of said first surface or said second surface, is ascribed an element thickness proportional to the element thickness of the element of said first or second surface to which said element of said edge surface is adjacent.

85. A method as claimed in claim 84 wherein each said element of an edge surface is ascribed an element thickness between 0.5 and 1.5 times said element thickness of the element of said first or second surface to which said element of said edge surface is adjacent.

86. A method as claimed in claim 85 wherein each said element of an edge surface is ascribed an element thickness between 0.7 and 0.9 times said element thickness of the element of said first or second surface to which said element of said edge surface is adjacent.

87. A method as claimed in claim 86 wherein each said element of an edge surface is ascribed an element thickness of 0.75 times said element thickness of the element of said first or second surface to which said element of said edge surface is adjacent.

88. A method as claimed in claim 84 wherein each element of an edge surface not adjacent to said first or second surface is ascribed an element thickness based on an average of the element thicknesses of adjacent elements of said edge surface that have been ascribed element thicknesses.

89. A method as claimed in claim 81 wherein said elements are triangular.

90. A method as claimed in claim 89 wherein said elements are equilateral.

91. A method as claimed in claim 81 wherein said first and second representations comprise first and second meshes or lattices respectively, wherein said elements are interstices of said first and second meshes or lattices.

92. A method as claimed in claim 81 wherein said elements are quadrilateral.

93. A method for modelling a three dimensional object including:
   specifying first and second generally opposed surfaces of said object,
   forming first and second representations of said first and second surfaces respectively, wherein said first and second representations each comprise a plurality of elements,
   matching pairs of elements of said first and second surfaces between which a reasonable thickness may be defined, and
   outputting a model of said three dimensional object,
   wherein said elements are quadrilateral.

94. A method for modelling a three dimensional object including:
   specifying first and second generally opposed surfaces of said object,
   forming first and second representations of said first and second surfaces respectively, wherein said first and second representations each comprise a plurality of elements,
   matching pairs of elements of said first and second surfaces between which a thickness may be defined, and
   outputting a model of said three dimensional object,
   wherein each element of each of the matched pairs of elements is respectively assigned said thickness, and unmatched elements of said first and second surfaces are assigned thicknesses based on an average of the thicknesses of surrounding, matched elements of said first and second surfaces.

95. A method as claimed in claim 94, wherein any unmatched elements of said first and second surfaces that can not be matched are assigned thicknesses based on an average of the thicknesses of adjacent matched elements where such adjacent matched elements exist, or of adjacent unmatched elements where such adjacent matched elements do not exist and said adjacent unmatched elements have been assigned thicknesses.

96. A method as claimed in claim 95 wherein each element of an edge surface, between said first and second surfaces, and adjacent to either of said first and second surfaces is assigned a thickness proportional to the thickness of the element of the first or second surface to which said element of said edge surface is adjacent.

97. A method as claimed in claim 96 wherein each said element of an edge surface is assigned a thickness between 0.5 and 1.5 times said thickness of the element of said first or second surface to which said element of said edge surface is adjacent.

98. A method as claimed in claim 97 wherein each said element of an edge surface is assigned a thickness between 0.7 and 0.9 times said thickness of the element of said first or second surface to which said element of said edge surface is adjacent.

99. A method as claimed in claim 98 wherein each said element of an edge surface is assigned a thickness of 0.75 times said thickness of the element of said first or second surface to which said element of said edge surface is adjacent.

100. A method as claimed in claim 96 wherein each element of an edge surface not adjacent to said first or second surface is assigned a thickness based on an average of the thicknesses of adjacent elements of said edge surface that have been assigned thicknesses.

* * * * *